United States Patent
Jadav et al.

(10) Patent No.: US 10,798,527 B2
(45) Date of Patent: Oct. 6, 2020

(54) COGNITIVE PROGRESSIVE METHOD AND SYSTEM FOR DEPLOYING INDOOR LOCATION SENSOR NETWORKS

(71) Applicant: International Business Machines Corporation, Armonk, NY (US)

(72) Inventors: Divyesh Jadav, San Jose, CA (US); German H Flores, San Jose, CA (US); Thomas D. Griffin, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/137,316

(22) Filed: Sep. 20, 2018

(65) Prior Publication Data

US 2020/0100063 A1    Mar. 26, 2020

(51) Int. Cl.
*H04W 4/029* (2018.01)
*H04W 4/33* (2018.01)
(Continued)

(52) U.S. Cl.
CPC .......... *H04W 4/029* (2018.02); *H04B 17/318* (2015.01); *H04L 67/12* (2013.01); *H04W 4/33* (2018.02)

(58) Field of Classification Search
CPC ....... H04W 4/029; H04W 4/33; H04W 24/00; H04B 17/318; H04L 67/12
See application file for complete search history.

(56) References Cited

U.S. PATENT DOCUMENTS 6,554,107 B2    4/2003   Yumura et al.
7,756,528 B2    7/2010   Yamada et al.
(Continued)

FOREIGN PATENT DOCUMENTS

CN    107738963 A    2/2018
WO    2017024102 A1    2/2017

OTHER PUBLICATIONS

Indoors, "indoo.rs SLAM Revolutionising Indoor Positioning," dated Oct. 2016, 4 pages, retrieved from https://web.archive.org/web/20161010045951/http://slaminfo.indoo.rs.
(Continued)

*Primary Examiner* — Marcus Hammonds
(74) *Attorney, Agent, or Firm* — Zilka-Kotab, P.C.

(57) ABSTRACT

Cognitive, progressive methods, systems, and computer program products for guiding users throughout a deployment process involving deploying location sensors throughout an indoor environment based on real-time detection of signals from deployed location sensors and/or distances between location sensors are disclosed, according to various embodiments. The inventive concepts allow real-time sensing and adjustment to the nature of the environment, such as geometry, signal interference, etc. based on sensor readings detected by a user using a sensing device. Additional embodiments include generating a map of the environment based on training data including location sensor signal measurements, identifying information, and location information and static data regarding location sensors deployed throughout the environment. Connections are established between the static and training data, and region types within the environment determined and labeled based on the density of different types of connections and/or connection crossings. The labeled regions are output as a map.

21 Claims, 7 Drawing Sheets

(51) Int. Cl.
*H04L 29/08* (2006.01)
*H04B 17/318* (2015.01)

(56) References Cited

U.S. PATENT DOCUMENTS

| | | | |
|---|---|---|---|
| 9,444,924 | B2 | 9/2016 | Rodriguez et al. |
| 9,484,046 | B2 | 11/2016 | Knudson et al. |
| 9,674,648 | B1 | 6/2017 | Greenberger |
| 2007/0041352 | A1 | 2/2007 | Frankel et al. |
| 2007/0117567 | A1* | 5/2007 | Rappaport ........... H04B 17/309 455/446 |
| 2010/0322077 | A1* | 12/2010 | Cho ........................ G01S 5/021 370/241 |
| 2012/0218436 | A1 | 8/2012 | Rhoads et al. |
| 2013/0225197 | A1 | 8/2013 | McGregor et al. |
| 2014/0226524 | A1* | 8/2014 | Kalika ............... H04N 21/4126 370/254 |
| 2015/0181384 | A1 | 6/2015 | Mayor et al. |
| 2016/0128049 | A1 | 5/2016 | Phillips-Lubimiv et al. |
| 2016/0225009 | A1 | 8/2016 | Lerman et al. |
| 2017/0070847 | A1 | 3/2017 | Altman et al. |
| 2017/0215041 | A1 | 7/2017 | Liu et al. |
| 2017/0245104 | A1 | 8/2017 | Klimek et al. |
| 2018/0005404 | A1 | 1/2018 | Liu |

OTHER PUBLICATIONS

Estimote, "Developer Docs," dated Dec. 2016, 8 pages, retrieved from https://web.archive.org/web/20161222044909/http://developer.estimote.com/indoor/map-your-location/.
Jibestream, "The world's premier indoor navigation and mapping engine," dated Oct. 2016, 6 pages, retrieved from https://web.archive.org/web/20161013044053/http://www.jibestream.com/.
Nextome, "Introducing nextome. The most innovative Indoor Navigation System is here," dated Nov. 2016, 6 pages, retrieved from https://web.archive.org/web/20161105195641/http://nextome.net/en/index.php.
Gasiorek, A., "Location Engine and Gateway FAQ" kontakt.io blog, Oct. 24, 2016, 9 pages, retrieved from https://kontakt.io/blog/location-engine-and-gateway-faq/.
Jadav et al., U.S. Appl. No. 16/141,788, filed Sep. 25, 2018.
Arkin et al., "Optimal Placement of Protective Jammers for Securing Wireless Transmissions in a Geographic Domain," IPSN, ACM, Apr. 2015, pp. 37-46.
Krishnamachari, B., "An Introduction to Wireless Sensor Networks," Tutorial Presented at the Second International Conference on Intelligent Sensing and Information Processing (ICISIP), 2005, pp. 1-101.
Anonymous, "Method and System for Multi-perception Cognitive Mapping," IP.com Prior Art Database, Technical Disclosure No. IPCOM000236870D, May 20, 2014, pp. 1-2.
Anonymous, "Cognitive Activation of a Panic Mode of Operation for a Mobile Device," IP.com Prior Art Database, Technical Disclosure No. IPCOM000244895D, Jan. 27, 2016, pp. 1-5.
Anonymous, "Geo Beacon Position Verification," IP.com Prior Art Database, Technical Disclosure No. IPCOM000213414D, Dec. 14, 2011, pp. 1-5.
Kohne et al., "Location-based Services with iBeacon Technology," Second International Conference on Artificial Intelligence, Modelling and Simulation, 2014, pp. 315-321.
Mainetti et al., "A survey on indoor positioning systems," IEEE 22nd International Conference on Software, Telecommunications and Computer Networks (SoftCOM), 2014, pp. 111-120.
Rajagopal et al., "Beacon Placement for Range-Based Indoor Localization," International Conference on Indoor Positioning and Indoor Navigation, Oct. 2016, pp. 1-8.

\* cited by examiner

Algorithm 1: Location Sensor Indoor Mapping

1 Given:
  {Boffline}, set of annotated location sensor readings from training data
  {Bstatic}, set of deployed location sensor (includes beacon IDs and (X-Y) location of deployment)

2 Initialize:
  $M = \infty$, geometric map based on location sensor readings
  $\delta = K$, the RSSI threshold defined as weak signal, where K is a minimum signal threshold, which may be learned from the training data or designated by the user
  $\rho_{min}$ = minimum density threshold
  $\chi_{min}$ = minimum crossing threshold

3 for each {Boffline}:
4   draw a line between each Boffline && Bstatic:
5     draw a first line type if the received signal strength indicator (RSSI) is >= $\delta$
6     draw a second line type if the received signal strength is < $\delta$

7 Find regions that best encapsulate the areas defined by first and second line types. For example, using convex hull algorithm, Graham scan, Quickhull, or other known clustering algorithm(s).

8 Classify areas within the space as either walls, hallways, or open spaces based on the density of the regions
  *hallways*: dense first line type areas, e.g. having a density above a minimum density threshold $\rho_{min}$, and sparse second line type crossings, i.e. having a number of crossings below a minimum crossing threshold $\chi_{min}$
  *walls*: dense second line type crossings, i.e. having a number of crossings above a minimum crossing threshold $\chi_{min}$, and sparse first line type areas, e.g. having a density below a minimum density threshold $\rho_{min}$
  *open spaces*: empty areas and/or dense first line type regions, e.g. having a density above a minimum density threshold $\rho_{min}$, and having a number of crossings below a minimum crossing threshold $\chi_{min}$

9 auto sketch and label walls, hallways, and open spaces using known techniques

10 (optional) Allow user correction of geometric shapes, e.g. by manually dragging various points/vertices of the initial shape to redefine/correct into a final shape

11 label map as either 'open space', 'closed space', or 'undetermined' based on the sparsity of the estimated areas

12 return M

FIG. 4

COGNITIVE PROGRESSIVE METHOD AND SYSTEM FOR DEPLOYING INDOOR LOCATION SENSOR NETWORKS

BACKGROUND

The present invention relates to indoor location services, and more specifically, this invention relates to cognitive, progressive techniques and systems for deploying indoor location sensor networks.

The use of Global Positioning System (GPS) to detect the location and direction of a client device (or GPS receiver), and thence to navigate from point A to point B is well established. The GPS receiver uses signals from at least 4 GPS orbiting satellites to calculate a three dimensional Cartesian coordinate (with the Earth's center as origin) of the receiver device. The coordinates are often converted to the more well-known latitude and longitude and elevation above sea level system. GPS technology works very well for positioning, when there are no obstructions to the receipt of satellite signals.

However, the inside of a building is not so friendly. There are materials that absorb or dampen the satellite signals, which often renders GPS unusable inside a building. In contemporary society, users spend a big portion of their time inside a building—at work and/or for leisure. In a large building such as a mall, a warehouse, a university or corporate campus, a visitor often needs assistance to determine where he is in the building, and how to get from point A to point B.

Wi-Fi networks have been explored as one potential solution for indoor navigation, however, most enterprises would prefer not to expose and use their Wi-Fi networks for orthogonal uses like for example Wi-Fi real-time location system (RTLS) positioning and routing due to performance and security exposure reasons; nor would prefer to expand their existing Wi-Fi network infrastructure, e.g. adding additional Wi-Fi access points, to increase coverage and reliability due to additional installation and maintenance costs.

Accordingly, it would be beneficial to provide novel and useful systems, methods, and computer program products for facilitating deployment of a precise, functional sensor network in an indoor environment.

SUMMARY

According to one embodiment, a computer-implemented method for cognitive, progressive deployment of an indoor location sensor network includes: providing an instruction to deploy a first location sensor at a first location within an indoor environment; receiving a plurality of signals from the first location sensor while moving away from the first location sensor, wherein each signal is characterized by a signal strength; analyzing each of the signals received from the first location sensor to determine the signal strength thereof; in response to determining: the signal strength of a last received one of the signals from the first location sensor is less than a predetermined minimum signal strength threshold, and/or a distance traveled from the first location sensor is greater than or equal to a maximum inter-sensor distance threshold: providing an instruction to deploy a second location sensor at a second location within the indoor environment, the second location being a position where: the signal strength of the last received one of the signals from the first location sensor was less than the predetermined minimum signal strength threshold, and/or the distance traveled from the first location sensor was greater than or equal to the maximum inter-sensor distance threshold; receiving a plurality of signals from the first location sensor and a second plurality of signals from the second location sensor, while moving away from at least the second location sensor, wherein each signal is characterized by a signal strength; analyzing each of the first plurality of signals and the second plurality of signals to determine the signal strength thereof; in response to determining: the signal strength of a last received one of the signals from the first location sensor and/or a last received one of the signals from the second location sensor is less than a predetermined minimum signal strength threshold, and/or a distance traveled from the second location sensor is greater than or equal to the maximum inter-sensor distance threshold: providing an instruction to deploy a third location sensor at a third location within the indoor environment, the third location being a position where: the signal strength of the last received one of the signals from the first location sensor and/or the last received one of the signals from the second location sensor was less than the predetermined minimum signal strength threshold, and/or the distance traveled from the second location sensor was greater than or equal to the maximum inter-sensor distance threshold.

According to another embodiment, a computer program product for cognitive, progressive deployment of an indoor location sensor network includes a computer readable medium having program instructions embodied therewith, where the computer readable medium is not a transitory signal per se. The program instructions are executable by a sensing device to cause the sensing device to perform a method, including: providing, via the sensing device, an instruction to deploy a first location sensor at a first location within an indoor environment; receiving, at the sensing device, a plurality of signals from the first location sensor while moving away from the first location sensor, wherein each signal is characterized by a signal strength; analyzing, using a processor of the sensing device, each of the signals received from the first location sensor to determine the signal strength thereof; in response to determining, using the processor of the sensing device: the signal strength of a last received one of the signals from the first location sensor is less than a predetermined minimum signal strength threshold, and/or a distance traveled from the first location sensor is greater than or equal to a maximum inter-sensor distance threshold: providing an instruction, via the sensing device, to deploy a second location sensor at a second location within the indoor environment, the second location being a position where: the signal strength of the last received one of the signals from the first location sensor was less than the predetermined minimum signal strength threshold, and/or the distance traveled from the first location sensor was greater than or equal to the maximum inter-sensor distance threshold; receiving, at the sensing device, a plurality of signals from the first location sensor and a second plurality of signals from the second location sensor, while moving away from at least the second location sensor, wherein each signal is characterized by a signal strength; analyzing, using the processor of the sensing device, each of the first plurality of signals and the second plurality of signals to determine the signal strength thereof; in response to determining, using the processor of the sensing device: the signal strength of a last received one of the signals from the first location sensor and/or a last received one of the signals from the second location sensor is less than a predetermined minimum signal strength threshold, and/or a distance traveled from the second location sensor is greater than or equal to a maximum inter-sensor distance threshold: providing, via the sensing device, an instruction to deploy a third location sensor at a third location within the indoor environment, the third location being a position where: the signal strength of the last received one of the signals from the first location sensor and/or the last received one of the signals from the second location sensor was less than the predetermined minimum signal strength threshold, and/or the distance traveled from the second location sensor was greater than or equal to the maximum inter-sensor distance threshold.

According to yet another embodiment, a system for cognitive, progressive deployment of an indoor location sensor network includes: a processor; and logic integrated with the processor, executable by the processor, or integrated with and executable by the processor. The logic is configured to: provide an instruction to deploy a first location sensor at a first location within an indoor environment; receive a plurality of signals from the first location sensor while moving away from the first location sensor, wherein each signal is characterized by a signal strength; analyze each of the signals received from the first location sensor to determine the signal strength thereof; in response to determining: the signal strength of a last received one of the signals from the first location sensor is less than a predetermined minimum signal strength threshold, and/or a distance traveled from the first location sensor is greater than or equal to a maximum inter-sensor distance threshold: provide an instruction to deploy a second location sensor at a second location within the indoor environment, the second location being a position where: the signal strength of the last received one of the signals from the first location sensor was less than the predetermined minimum signal strength threshold, and/or the distance traveled from the first location sensor was greater than or equal to the maximum inter-sensor distance threshold; receive a plurality of signals from the first location sensor and a second plurality of signals from the second location sensor, while moving away from at least the second location sensor, wherein each signal is characterized by a signal strength; analyze each of the first plurality of signals and the second plurality of signals to determine the signal strength thereof; in response to determining: the signal strength of a last received one of the signals from the first location sensor and/or a last received one of the signals from the second location sensor is less than a predetermined minimum signal strength threshold, and/or a distance traveled from the second location sensor is greater than or equal to a maximum inter-sensor distance threshold: provide an instruction to deploy a third location sensor at a third location within the indoor environment, the third location being a position where: the signal strength of the last received one of the signals from the first location sensor and/or the last received one of the signals from the second location sensor was less than the predetermined minimum signal strength threshold, and/or the distance traveled from the second location sensor was greater than or equal to the maximum inter-sensor distance threshold.

According to still yet another embodiment, a computer-implemented method for cognitively, progressively generating a map of an indoor environment includes: receiving training data comprising a plurality of location sensor signal measurements, each location sensor signal measurement comprising a received signal strength, identifying information, and a corresponding location within the indoor environment; receiving a set of static data comprising an identification and a location of each of a plurality of location sensors deployed throughout the indoor environment; establishing a plurality of connections between the static data and the training data; identifying a plurality of regions within the indoor location based on the plurality of connections between the static data and the training data; labeling a type of each region based at least in part on: a density of connections within the respective region; a density of connection crossings within the respective region; and outputting the map.

According to a further embodiment, a computer program product for cognitively, progressively generating a map of an indoor environment includes a computer readable medium having program instructions embodied therewith, wherein the computer readable medium is not a transitory signal per se. The program instructions are executable by a processor to cause the processor to perform a method, comprising: receiving, at the processor, training data comprising a plurality of location sensor signal measurements, each location sensor signal measurement comprising a received signal strength, identifying information, and a corresponding location within the indoor environment; receiving, at the processor, a set of static data comprising an identification and a location of each of a plurality of location sensors deployed throughout the indoor environment; establishing, using the processor, a plurality of connections between the static data and the training data; identifying, using the processor, a plurality of regions within the indoor location based on the plurality of connections between the static data and the training data; and labeling, using the processor, a type of each region based at least in part on: a density of connections within the respective region; a density of connection crossings within the respective region; and outputting, using the processor, the map.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4 is a pseudocode representation of an algorithm for cognitively and progressively generating a map of an indoor location using a location sensor network, according to one embodiment.

DETAILED DESCRIPTION

Figure 1:
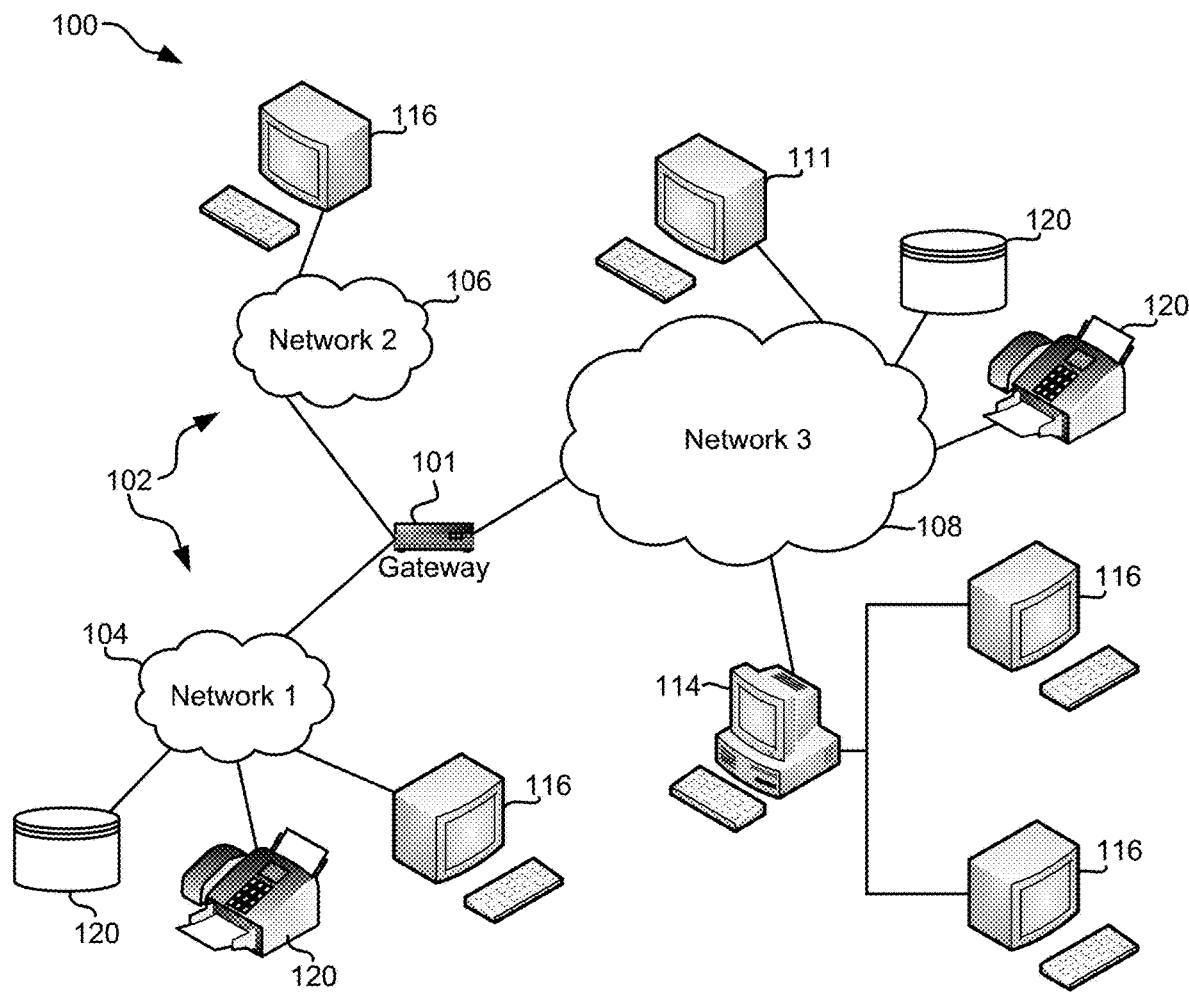
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for cognitive, progressive deployment of location sensor networks and applications thereof, including but not limited to generating maps of indoor locations and locating position of a sensing device along a one-dimensional path, among others.

The uses and applications of the inventive concepts described herein are several-fold. One is to advise the user on the efficient deployment of location sensors, e.g. an iBeacon or Eddystone, to form a location sensor network in an indoor environment. Such embodiments are useful as potential application for recycling of location sensors, where a vendor/customer has existing inventory of different types of location sensors with different capabilities and/or different remaining power levels. As referenced herein, the term "location sensor" shall be understood as any type of device capable of broadcasting a signal, or signals, from which the location and preferably the identity of the sensor may be determined. Broadcasting may include actively transmitting signal(s), reflecting received signal(s), or any equivalent thereof that would be appreciated by a person having ordinary skill in the art upon reading the present disclosure. In various embodiments, exemplary types of location sensors include, but are not limited to, Wi-Fi access points, GPS devices, RFID devices, beacons such as Bluetooth Low Energy (BLE) beacons, of any variety and in any combination, without limitation, as well as equivalents thereof that a skilled artisan would appreciate upon reading this description.

A second objective/application is to facilitate a user building a map of an indoor location using an existing location sensor network, but without relying on a predetermined floor plan, map, blueprint etc. for the indoor location. A user may do so by walking around an enclosed space and, using a sensing device, receiving different signal strengths from various location sensors deployed throughout the space. Using the received signal strengths, it is possible to build a representation or radio map of the location. For example, the signal strength may be classified as "strong" "weak" or "none," and it is possible to use these signal strengths (e.g. as a heat map) to determine if an object or other source of signal interference is present at a particular location within a signal space. This second application also facilitates determining a user's (X, Y) coordinates within a given two-dimensional space. Using a priori knowledge regarding location sensor location and user location, presence of obstacles or other sources of signal interference may be determined based on received signal strength.

As understood herein, "sensing devices" refer to any type of device, preferably a mobile device such as a handheld computer, personal digital assistant, tablet, smartphone, and any equivalents thereof that would be understood by skilled artisans reading this description as capable of receiving signals from location sensors deployed throughout an environment, and processing such signals (e.g. using dedicated application software, a dedicated API, and/or services running on or otherwise provided to/by the sensing device) to determine a location of the location sensor sending the signal. Preferably, the sensing device also includes a graphical display and/or auditory components such as a microphone and speakers to provide visual and/or auditory information to the user, as well as receive input from the user, e.g. via a touchscreen or the microphone. The sensing device also preferably serves as a primary interface between the system and the user/client, and facilitates cognitive aspects of the invention, as described in greater detail below.

A third application, related but more focused in scope, is determining a location of a user or other object along a one-dimensional path, such as a horizontal track (hallway, monorail tunnel, etc.) or vertical shaft (e.g. an elevator shaft, stairwell, etc.) based on received signal strength. This third application is particularly useful in combination with the foregoing two applications, in that a two-dimensional or three-dimensional location sensor network and two-dimensional or three-dimensional location services may be provided for indoor environments.

Various embodiments in accordance with the foregoing applications, among others that may be appreciated by those having ordinary skill in the art upon reading the present description, will be discussed in further detail below.

As noted above, recent location services have turned attention to providing accurate, precise location information and associated services in indoor environments. However, conventional technologies utilized for determining location outdoors are not generally applicable to the same task in an indoor environment. Although some existing technology, such as Wi-Fi network location offers the possibility for location determination, doing so is very expensive, carries associated security risks, and has generally proven to be an impractical approach (e.g. redeployment of Wi-Fi network locations might not always be possible). Similarly, GPS location is unreliable when indoors, especially for large buildings with complex three dimensional structures.

One possible alternative technology to using known location determination techniques, such as Wi-Fi location, is known as Bluetooth Low Energy (BLE) beacons. BLE beacons are of increasing interest as an indoor proximity sensing technology. BLE beacons are attractive as they are inexpensive (tens of dollars per device), require little to no maintenance (one to about ten years of battery life depending on technology, battery management, and usage), and do not require use of a Wi-Fi network or access thereto, avoiding associated security risks. However, determining how to properly deploy an indoor positioning network based on BLE beacons is not straightforward, and requires great care and attention to detail.

Accordingly, the presently disclosed inventive concepts relate to cognitive techniques for deploying an indoor location sensor network, preferably using BLE beacons, as well as cognitive techniques for building a map of an indoor location using a location sensor network, and further still to determining a user's location in a one-dimensional, two-dimensional, or three-dimensional path, e.g. a horizontal direction along a hallway's path, or a vertical direction along a particular elevator's path, in various embodiments The exemplary embodiments shall be understood as related and various features of one may be applied to the other without departing from the scope of the present disclosure. Preferably, the various embodiments of the presently disclosed inventive concepts are "cognitive" in the sense that the deployment procedure/recommendation takes into account the remaining battery life and operational capabilities of each specific location sensor to be used for a deployment, as well as the knowledge from prior deployments or from a knowledge base; users may be coached or guided throughout the entire deployment phase; and all of these factors improves the performance of the resulting location sensor network.

According to one general embodiment, a computer-implemented method for cognitive, progressive deployment of an indoor location sensor network includes: providing an instruction to deploy a first location sensor at a first location within an indoor environment; receiving a plurality of signals from the first location sensor while moving away from the first location sensor, wherein each signal is characterized by a signal strength; analyzing each of the signals received from the first location sensor to determine the signal strength thereof; in response to determining: the signal strength of a last received one of the signals from the first location sensor is less than a predetermined minimum signal strength threshold, and/or a distance traveled from the first location sensor is greater than or equal to a maximum inter-sensor distance threshold: providing an instruction to deploy a second location sensor at a second location within the indoor environment, the second location being a position where: the signal strength of the last received one of the signals from the first location sensor was less than the predetermined minimum signal strength threshold, and/or the distance traveled from the first location sensor was greater than or equal to the maximum inter-sensor distance threshold; receiving a plurality of signals from the first location sensor and a second plurality of signals from the second location sensor, while moving away from at least the second location sensor, wherein each signal is characterized by a signal strength; analyzing each of the first plurality of signals and the second plurality of signals to determine the signal strength thereof; in response to determining: the signal strength of a last received one of the signals from the first location sensor and/or a last received one of the signals from the second location sensor is less than a predetermined minimum signal strength threshold, and/or a distance traveled from the second location sensor is greater than or equal to the maximum inter-sensor distance threshold: providing an instruction to deploy a third location sensor at a third location within the indoor environment, the third location being a position where: the signal strength of the last received one of the signals from the first location sensor and/or the last received one of the signals from the second location sensor was less than the predetermined minimum signal strength threshold, and/or the distance traveled from the second location sensor was greater than or equal to the maximum inter-sensor distance threshold.

According to another general embodiment, a computer program product for cognitive, progressive deployment of an indoor location sensor network includes a computer readable medium having program instructions embodied therewith, where the computer readable medium is not a transitory signal per se. The program instructions are executable by a sensing device to cause the sensing device to perform a method, including: providing, via the sensing device, an instruction to deploy a first location sensor at a first location within an indoor environment; receiving, at the sensing device, a plurality of signals from the first location sensor while moving away from the first location sensor, wherein each signal is characterized by a signal strength; analyzing, using a processor of the sensing device, each of the signals received from the first location sensor to determine the signal strength thereof; in response to determining, using the processor of the sensing device: the signal strength of a last received one of the signals from the first location sensor is less than a predetermined minimum signal strength threshold, and/or a distance traveled from the first location sensor is greater than or equal to a maximum inter-sensor distance threshold: providing an instruction, via the sensing device, to deploy a second location sensor at a second location within the indoor environment, the second location being a position where: the signal strength of the last received one of the signals from the first location sensor was less than the predetermined minimum signal strength threshold, and/or the distance traveled from the first location sensor was greater than or equal to the maximum inter-sensor distance threshold; receiving, at the sensing device, a plurality of signals from the first location sensor and a second plurality of signals from the second location sensor, while moving away from at least the second location sensor, wherein each signal is characterized by a signal strength; analyzing, using the processor of the sensing device, each of the first plurality of signals and the second plurality of signals to determine the signal strength thereof; in response to determining, using the processor of the sensing device: the signal strength of a last received one of the signals from the first location sensor and/or a last received one of the signals from the second location sensor is less than a predetermined minimum signal strength threshold, and/or a distance traveled from the second location sensor is greater than or equal to a maximum inter-sensor distance threshold: providing, via the sensing device, an instruction to deploy a third location sensor at a third location within the indoor environment, the third location being a position where: the signal strength of the last received one of the signals from the first location sensor and/or the last received one of the signals from the second location sensor was less than the predetermined minimum signal strength threshold, and/or the distance traveled from the second location sensor was greater than or equal to the maximum inter-sensor distance threshold.

According to yet another general embodiment, a system for cognitive, progressive deployment of an indoor location sensor network includes: a processor; and logic integrated with the processor, executable by the processor, or integrated with and executable by the processor. The logic is configured to: provide an instruction to deploy a first location sensor at a first location within an indoor environment; receive a plurality of signals from the first location sensor while moving away from the first location sensor, wherein each signal is characterized by a signal strength; analyze each of the signals received from the first location sensor to determine the signal strength thereof; in response to determining: the signal strength of a last received one of the signals from the first location sensor is less than a predetermined minimum signal strength threshold, and/or a distance traveled from the first location sensor is greater than or equal to a maximum inter-sensor distance threshold: provide an instruction to deploy a second location sensor at a second location within the indoor environment, the second location being a position where: the signal strength of the last received one of the signals from the first location sensor was less than the predetermined minimum signal strength threshold, and/or the distance traveled from the first location sensor was greater than or equal to the maximum inter-sensor distance threshold; receive a plurality of signals from the first location sensor and a second plurality of signals from the second location sensor, while moving away from at least the second location sensor, wherein each signal is characterized by a signal strength; analyze each of the first plurality of signals and the second plurality of signals to determine the signal strength thereof; in response to determining: the signal strength of a last received one of the signals from the first location sensor and/or a last received one of the signals from the second location sensor is less than a predetermined minimum signal strength threshold, and/or a distance traveled from the second location sensor is greater than or equal to a maximum inter-sensor distance threshold: provide an instruction to deploy a third location sensor at a third location within the indoor environment, the third location being a position where: the signal strength of the last received one of the signals from the first location sensor and/or the last received one of the signals from the second location sensor was less than the predetermined minimum signal strength threshold, and/or the distance traveled from the second location sensor was greater than or equal to the maximum inter-sensor distance threshold.

According to still yet another general embodiment, a computer-implemented method for cognitively, progressively generating a map of an indoor environment includes: receiving training data comprising a plurality of location sensor signal measurements, each location sensor signal measurement comprising a received signal strength, identifying information, and a corresponding location within the indoor environment; receiving a set of static data comprising an identification and a location of each of a plurality of location sensors deployed throughout the indoor environment; establishing a plurality of connections between the static data and the training data; identifying a plurality of regions within the indoor location based on the plurality of connections between the static data and the training data; labeling a type of each region based at least in part on: a density of connections within the respective region; a density of connection crossings within the respective region; and outputting the map.

According to a further general embodiment, a computer program product for cognitively, progressively generating a map of an indoor environment includes a computer readable medium having program instructions embodied therewith, wherein the computer readable medium is not a transitory signal per se. The program instructions are executable by a processor to cause the processor to perform a method, comprising: receiving, at the processor, training data comprising a plurality of location sensor signal measurements, each location sensor signal measurement comprising a received signal strength, identifying information, and a corresponding location within the indoor environment; receiving, at the processor, a set of static data comprising an identification and a location of each of a plurality of location sensors deployed throughout the indoor environment; establishing, using the processor, a plurality of connections between the static data and the training data; identifying, using the processor, a plurality of regions within the indoor location based on the plurality of connections between the static data and the training data; and labeling, using the processor, a type of each region based at least in part on: a density of connections within the respective region; a density of connection crossings within the respective region; and outputting, using the processor, the map.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, wearable device, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
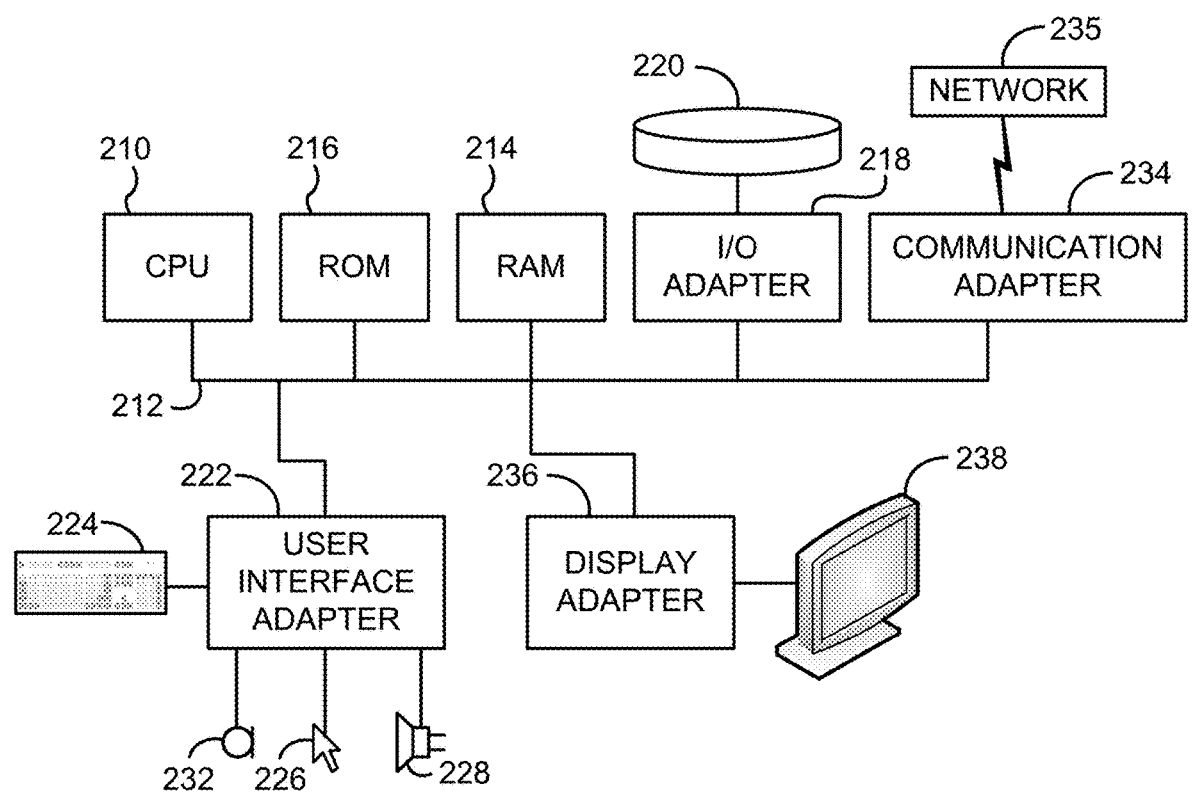
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Cognitive Deployment of Sensors within a Location Sensor Network

Conventional approaches to deploying indoor location sensor networks generally rely heavily on the use of floor maps and brute force deployment of location sensors to boost the accuracy and reliability of indoor location services. However, very little emphasis has been given to providing a cognitive engine to advise users how to deploy the location sensor networks in an optimally functional manner based on the operational characteristics of the location sensors, and practical aspects of the deployment environment, e.g. signal transmission dynamics. Ideally, location sensors should be deployed so as to minimize signal interference, while still providing sufficient signal coverage for locating a given user within the environment.

Accordingly, the presently described inventive concepts facilitate deploying a location sensor network in real-time based on knowledge about the capabilities of various location sensor types, and characteristics of the environment as determined in real-time during location sensor deployment. Advantageously, the inventive concepts herein may utilize, but do not require, a floor map or other a priori understanding of the physical layout of the space. Moreover, the network may be customized to include different location sensor types, according to the user's available inventory/budget.

Returning now to the application of guiding a user through location sensor deployment within a given space, in one general approach a user wishes to create a location sensor network throughout a two or three-dimensional space. The user designates a make and model of a location sensor (e.g. a BLE beacon for the preferred embodiment) that is to be used for the deployment, ideally from a catalog or other publicly available source of such location sensors. The system is equipped with a knowledge base (KB) including operational characteristics of various types of location sensors suitable for use in a location sensor network. If the KB includes such a priori knowledge and/or experience regarding operational capabilities of the particular type of device designated by the user, a deployment template of best practices for inter-device distances for various space configurations is available to the system and may determine, or be used to guide, the location sensor deployment process. If no such a priori knowledge is available, a new entry is created in the KB for the new device type.

The user starts at a point in the target deployment space, and deploys the first location sensor. The user then walks slowly away from that point. The system continuously monitors signals received from the first location sensor, e.g. using a sensing device held by the user during the deployment process. When the user reaches a known inter-location sensor separation distance, or a signal with questionable signal strength indicator is received by the sensing device (whichever comes first), the system directs the user to deploy the second location sensor.

After the second deployment, the system senses signals from two location sensors. The foregoing process repeats in substantially the same manner, and after the user reaches a known inter-location sensor separation distance, or a signal with questionable signal strength indicator is received by the sensing device (whichever comes first), the system directs the user to deploy the third location sensor.

After the third deployment, the system estimates a shape of the target deployment space. The estimated geometrical shape of the space is calculated from strong and weak RSSI readings measured as the user walks the space and deploys location sensors. Furthermore, previous deployment templates, if available in the knowledge base (KB), serve as a priori knowledge to fine tune the estimated shape of the target deployment space. This brings into play additional intelligence, gleaned from prior deployments for such a space shape, about preferred location sensor deployment points.

The foregoing procedure is repeated until the user has walked the requisite route, e.g. as defined by a predetermined threshold amount of the environment. In one embodiment, at a minimum, the user will have visited all accessible vertices (e.g. as occurring near or at various corners, doorways, walls, outcroppings, etc.) of the location. In another embodiment, a user will have visited at least a minimum threshold amount of the total area of the location, such as one third of the total area, one half of the total area, two thirds of the total area, etc. depending on the geometry of the location and the desired sensor coverage. In still more embodiments, a user will have visited all areas of interest of the location, and/or all accessible areas of interest, such as rooms, hallways, stairwells, auditoriums, etc. as would be understood by a person having ordinary skill in the art upon reading the present disclosure. Preferably, the user should have walked most, if not all, of the indoor location, including enclosed space(s) of interest, and using the sensing device, detected any available signals while traversing the environment.

As each location sensor is deployed, the system also refines its estimation of the shape of the deployment space. The output of the process then is (a) an estimated map constructed from the RSSI readings where the user walked; and (b) recommended points at which location sensors are to be deployed in real-time (and preferably which type of location sensor should be deployed at each respective point, as well as an optional minimum remaining battery level or power level of the location sensor).

Figure 3:
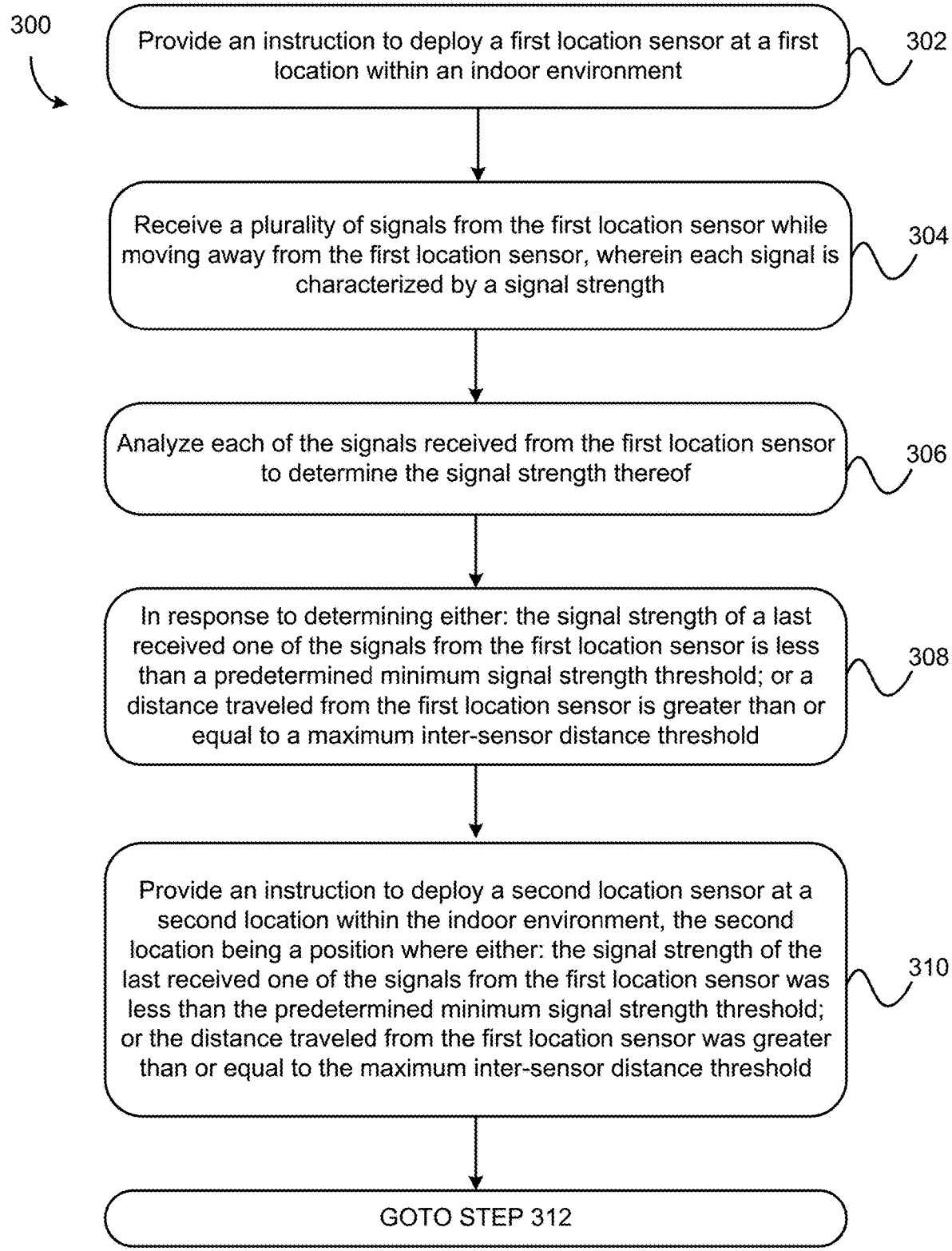
FIG. 3 illustrates flowchart of a method for cognitively and progressively deploying an indoor location sensor network, in accordance with one embodiment.
Figure 3:
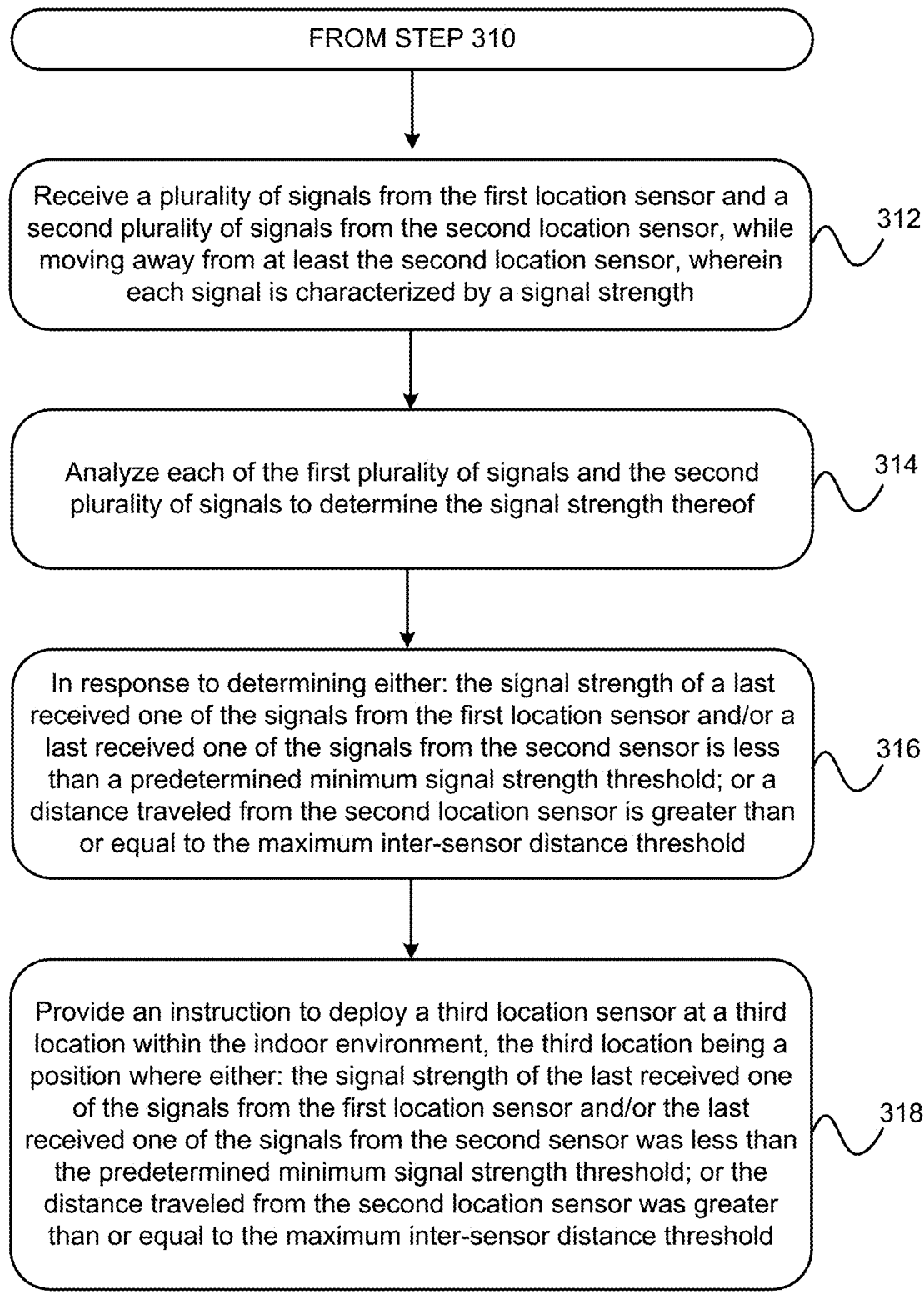

Accordingly in FIG. 3 a method 300 for deploying an indoor location sensor network is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a sensing device, or some other device having one or more processors therein. The processor, e.g., processing circuit(s), chip(s), and/or module(s) implemented in hardware and/or software, and preferably having at least one hardware component may be utilized in any device to perform one or more steps of the method 300.

Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where an instruction to deploy a first location sensor at a first location within an indoor environment is provided. The instruction may be provided in any suitable form, but preferably includes at least an auditory or visual signal to the user to deploy the first location sensor at the initial (first) location. In preferred embodiments, the user is interacting with a dedicated mobile application or mobile service for deploying location sensors, and the application includes a graphical user interface (GUI) with which the user may interact to provide feedback and/or receive instructions.

At any rate, after complying with the instruction to deploy the first location sensor, the user begins moving away from the first location sensor, optionally in response to an instruction to do so, and preferably in response to an instruction accompanied by a direction in which the user should move. While moving away from the first location sensor, the first location sensor periodically or continuously transmits a signal or series of signals, characterized by a given signal strength. In operation 304, while moving away from the first location sensor, this first plurality of signals are received, e.g. by an antenna such as a Bluetooth antenna, radio antenna, or other receiver of the sensing device.

Again while in motion away from the first location sensor, and preferably in real time performing operation 306 includes analyzing the received signals to determine the respective signal strength thereof. As will be appreciated by those having ordinary skill in the art, signal strength may (but is not always, e.g. in the case of interference) be an indicator of distance between transmitter and receiver of the corresponding signal. Accordingly, determining signal strength allows an inference of the distance between first location sensor and the sensing device as the user moves away from the first location sensor.

Additionally or alternatively, distance from the first location sensor may be measured using other components, sensors, and/or functionality of the sensing device, including but not limited to an accelerometer, magnetometer, and gyroscope, and corresponding software. Preferably, distance is measured using the foregoing approach, as well as signal strength, since the ultimate measure of success for the location sensor network is ability of sensors to precisely and accurately detect and report location of objects within the indoor environment such as walls, furniture, doors/entryways, statues or other large fixtures, and even people, in various embodiments and as would be understood by a person having ordinary skill in the art upon reading the present disclosure. Measuring distance by both means enables inference as to the location of potential sources of signal interference, as will be described in greater detail below, inter alia, regarding generating maps of indoor locations using location sensor networks.

At any rate, whether via analyzing signal strengths, directly measuring distance using other capabilities of the sensing device, or both, in operation 308 a determination regarding distance traveled from the first location sensor is made. The determination is made either on the basis of determining the signal strength of a last received one of the signals from the first location sensor is less than a predetermined minimum signal strength threshold; or that a distance traveled from the first location sensor is greater than or equal to a maximum inter-sensor distance threshold. In either case, an affirmative determination indicates the user's location is a suitable one for deployment of another sensor, since traveling further from the previously deployed sensor is likely to result in suboptimal communication/coverage within the location sensor network.

Accordingly, operation 310 involves providing an instruction to deploy a second location sensor at a second location within the indoor environment, the second location being a position where either: the signal strength of the last received one of the signals from the first location sensor was less than the predetermined minimum signal strength threshold; or the distance traveled from the first location sensor was greater than or equal to the predetermined maximum inter-sensor distance threshold.

Following operation 310, various embodiments of method 300 essentially include an iterative repetition of the foregoing operations performed in steps 302-310. However, as additional location sensors are deployed, and additional signals received from multiple location sensors and corresponding directions, deployment of location sensors at any given location becomes a more complex determination. For instance, in one embodiment a heuristic algorithm may be employed to create various "zones" within an indoor environment, with each zone being "covered" by one or more, preferably at least three, location sensors. Other deployment patterns (including random or stochastic patterns) may be employed in various embodiments without departing from the scope of the present disclosures.

Returning now to the specific embodiment shown in FIG. 3, in operation 312 again while moving away from the second location sensor (and preferably also away from the first location sensor, but not necessarily so) a second plurality of signals are received. The second plurality of signals are received from the second location sensor, and are also characterized by respective signal strengths that may be indicative of distance between the sensing device and the second location sensor. Concurrently, the first location sensor continues its periodic/continuous signal transmission and as such signal(s) continue being received at the sensing device.

The first signals are characterized by a first signal strength and the second signals are characterized by a second signal strength. When moving away from both the first and second location sensors in operation 312, the strength of both will drop with distance traveled. However, if moving away from the second location sensor while moving toward the first location sensor, signal strength of the first plurality of signals (from the first location sensor) will rise, and signal strength of the second plurality of signals (from the second location sensor) will drop, as a function of distance traveled from the second location. This is another reason why tracking distance using independent sensors and signal types is an advantageous feature of the presently described inventive concepts.

Regardless of distance/direction indicated, in operation 314 the signals received from the first and second location sensors are analyzed to determine the respective signal strengths thereof.

Operation 316 involves another determination, this time whether: (a) the signal strength of a last received one of the first plurality of signals from the first location sensor and/or a last received one of the second plurality of signals from the second location sensor is less than a predetermined minimum signal strength threshold; or alternatively (b) a distance traveled from the second location sensor is greater than or equal to a maximum inter-sensor distance threshold.

If either (a) or (b) is true (determination=yes), in operation 318 an instruction to deploy a third location sensor at a third location within the indoor environment is provided via the sensing device. As with similar previous operations, the third location is the position where either: the signal strength of the last received one of the signals from the first location sensor and/or the last received one of the signals from the second location sensor was less than the predetermined minimum signal strength threshold; or the distance traveled from the second location sensor was greater than or equal to the maximum inter-sensor distance threshold.

As noted above, method 300 may proceed iteratively to add more location sensors to the location sensor network until such time as sufficient coverage has been achieved, e.g. as may be determined with respect to a predetermined threshold amount of the environment. This may be indicated, in various embodiments, by a user operating the sensing device having visited all accessible vertices of an environment, visited at least a minimum threshold amount of the total area of the location, visited all areas of interest of the location, and/or all accessible areas of interest, etc. as would be understood by a skilled artisan upon reading the present descriptions. Regardless of the number of location sensors ultimately required, the method 300 may provide as output: (1) an estimated map of the indoor environment, the map being based on the path followed by the user to deploy the various location sensors, and/or (2) a recommendation of various point(s) throughout the indoor environment where location sensors may/should be placed to improve or accomplish signal coverage within the indoor environment.

For instance, in one particular implementation, method 300 includes iteratively repeating the following steps until a predetermined, threshold amount of the environment has been visited, or equivalently interrogated, by the user operating the sensing device. In various approaches, the predetermined threshold amount may be defined according to an amount of the total area of the environment, an amount of the total accessible area of the environment, a number or identification of various vertices (e.g. formed by walls, doors, furniture, fixtures, etc.) throughout the environment, a number of rooms of the environment, etc. as described herein and as would be appreciated by a person having ordinary skill in the art upon reading the instant disclosures.

First, receive signals from at least the first location sensor, the second location sensor, the third location sensor, and (optionally) an iteratively increasing number of additional location sensors placed throughout the indoor environment, wherein each signal is characterized by a respective signal strength.

Second, analyze each of the received signals to determine the signal strength thereof.

Third, provide an instruction to deploy an additional location sensor in response to determining either: (a) the signal strength of one of the signals received from the first location sensor, the second location sensor, the third location sensor, and/or one of the iteratively increasing number of additional location sensors placed throughout the indoor environment is less than the predetermined minimum signal strength threshold; or (b) a distance traveled from the first location sensor, the second location sensor, the third location sensor, and/or one of the iteratively increasing number of additional location sensors placed throughout the indoor environment is greater than or equal to a maximum inter-sensor distance threshold.

In this manner, additional location sensors may be placed throughout the indoor environment to improve the signal coverage thereover for purposes of location detection and providing location services indoors.

Moreover, in various embodiments, method 300 is not limited to the features, operations, and limitations specifically shown in FIG. 3 and described hereinabove. Rather, method 300 may be employed in any suitable environment/manner described herein, and may include any number of additional or alternative features, limitations, operations, functionalities, etc. described herein, in any combination, without departing from the scope of the inventive concepts described herein.

For instance, in one embodiment, method 300 involves: generating a composite map of the indoor environment based on a plurality of signals received from the first location sensor, the second location sensor, the third location sensor, and one or more additional location sensor(s) placed throughout the location sensor network. The composite map is preferably generated using the signal data as training data, coupled with a priori knowledge regarding the operational capabilities and remaining power of the various sensors to be deployed in the indoor environment.

Alternatively, the map may be generated from a template retrieved based on the type of the location sensor(s). For instance, method 300 may include designating a type of the first location sensor prior to deploying the first location sensor at the first location, and retrieving a template from a knowledge base, the template corresponding to the type of the first location sensor and describing best practices for the maximum inter-sensor distance according to various spatial configurations possible within the indoor environment. In this case, the instructions to deploy the first location sensor, the instructions to deploy the second location sensor, and the instructions to deploy the third location sensor, and instructions to deploy any additional location sensors in the location sensor network are based on the template.

Whether based on templates or otherwise, in one approach generating a map of a location includes estimating the shape of various regions within the location. In on embodiment, therefore, method 300 includes receiving a plurality of signals from the first location sensor, a second plurality of signals from the second location sensor, and a third plurality of signals from the third location sensor, wherein each signal is characterized by a signal strength; and estimating a shape of an area enclosed by the first location sensor, the second location sensor, and the third location sensor based on the respective signal strength of the plurality of signals from the first location sensor, the second plurality of signals from the second location sensor, and the third plurality of signals from the third location sensor.

Of course, those having ordinary skill in the art will appreciate that the presently disclosed inventive concepts, and especially those discussed with respect to location sensor deployment per FIG. 3 and method 300, are not limited to deployment of only three beacons, but also apply to deployment of any number of beacons throughout an environment. For instance, in one illustrative embodiment the inventive concepts described herein may include iteratively adding additional sensors in a manner substantially as described with reference to method 300, e.g. iteratively performing operations such as described in steps 302-310 with additional sensors and corresponding signals/distance measurements.

The shapes may be estimated using any suitable known technique, but in preferred embodiments uses a convex hull algorithm such as a Graham scan or a Quickhull algorithm, or any suitable clustering algorithm, in various approaches and as would be appreciated by a person having ordinary skill in the art upon reading the present descriptions.

Figure 5:
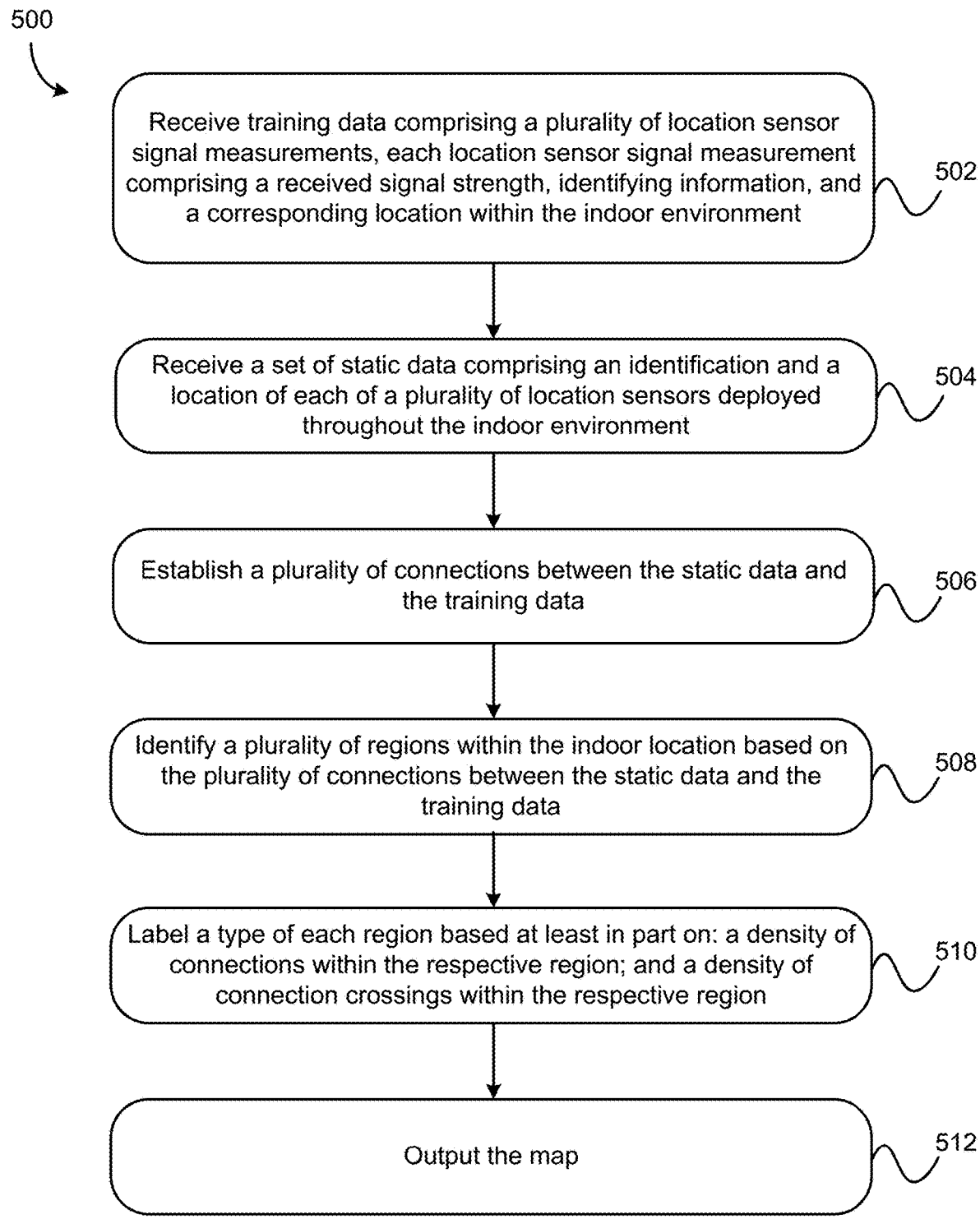
FIG. 5 illustrates flowchart of a method for cognitively and progressively generating a map of an indoor location using a location sensor network, in accordance with one embodiment.

Accordingly, in several embodiments, method 300 represents an alternative approach to generating a map of an indoor location, such as shown in FIG. 5 and described in greater detail below with reference to method 500.

In another embodiment, method 300 may include defining one or more thresholds for use during deployment based on operational characteristics of the location sensor(s) to be deployed. For instance, in one approach the minimum signal strength threshold and the maximum inter-sensor distance threshold are each based on the type of location sensor to be deployed in the location sensor network. In another approach, the minimum signal strength threshold and the maximum inter-sensor distance threshold are each based on operational characteristics of various location sensor types, including but not limited to different average signal strength, a different average signal sensitivity; and/or a different average signal range, any one or more of which may be used to compute an estimated distance and/or set appropriate thresholds for suggesting a next location sensor location, in one embodiment.

Similarly, in one embodiment, alternative or in addition to location sensor type information, location sensor battery/power information may be provided, and this information may inform the placement of location sensors throughout the environment. Since available power can affect signal strength, location sensor sensitivity, and of course life span, all three (among other) criteria are important to determining distance between receiver and transmitter of a signal. Taking these factors into account improves the performance of the resulting location sensor network, and renders the technique "cognitive" in the context of the presently described inventive concepts.

For example, in one approach method 300 includes designating a remaining power or battery level of each location sensor to be deployed in the location sensor network, wherein a minimum signal strength threshold and a maximum inter-sensor distance threshold are each based on the remaining power or battery level of the respective location sensor to be deployed in the location sensor network.

Accordingly, skilled artisans will appreciate that location sensor networks within the scope of the present disclosure may include any number of known location sensor types with characteristic operational characteristics and/or remaining power levels, each of which may be utilized to facilitate deployment of the location sensors throughout the network. Exemplary operational characteristics, in various embodiments, may include any combination of remaining power, power source, broadcast rate, expected lifetime, prior use status, communication protocol, and/or signal type, or any one of the foregoing characteristics.

However, not all location sensor types and/or operational characteristics thereof may be known a priori. In such embodiments, it is advantageous to build upon an existing knowledge base of location sensors by creating a new entry and logging operational characteristics of the new location sensor type. In various instances, therefore, method 300 may include determining no a priori knowledge is available regarding operational characteristics of the designated type of a given location sensor to be deployed in the location sensor network; determining one or more of the operational characteristics of the designated type of the given location sensor during deployment thereof within the location sensor network; and storing the determined one or more operational characteristics of the designated type of the given location sensor in a knowledge base for future use.

The knowledge base may be stored in a memory of a sensing device used to deploy the location sensor network, a server serving location sensor network capabilities, or any other suitable device/location as would be appreciated by those having ordinary skill in the art upon reading the present descriptions.

Optionally, the operational characteristics for various location sensor types may be updated over time based on observed observational characteristics of various deployed location sensor types. In this manner, the operational characteristics may be fine-tuned for a given environment, inherently accounting for sources of noise, signal interference, etc. which may detrimentally affect performance of the overall location sensor network.

Moreover, in preferred implementations of method 300, and as described in further detail below with reference to Algorithm 1, a user may disobey or ignore a given suggestion to place a location sensor at a given location, and/or the type of location sensor to deploy at a given location. Accordingly, method 300 may include functions to determine the actual type of location sensor (e.g. based on unique ID, detected characteristics, etc.) and make inferences regarding the location sensor network based on the user's actual behavior.

Accordingly, in various approaches the location sensors suggested for deployment may include any number of different location sensor types, each location sensor type having different operational characteristics (such as battery power, expected lifetime, broadcast rate, broadcast frequency, range, etc. as would be understood by a person having ordinary skill in the art upon reading the present descriptions). For example, in easily accessible, open areas location sensors having less robust capabilities may be deployed instead of newer and/or more powerful location sensors so as to minimize overall system cost. Conversely, in areas where poor signal is expected (e.g. due to geometry, interference, etc.) more robust location sensor types may be recommended. In still more approaches, suggested location sensor types may alternate between relatively high cost/high quality and relatively low cost/low quality, e.g. alternating between new and refurbished location sensors.

In a particularly preferred embodiment, the location sensor types are selected from a group consisting of: new location sensors, old location sensors (whether previously used or not), used location sensors, refurbished location sensors, high-power location sensors, low-power location sensors, solar-powered location sensors, battery-powered location sensors, active sensors, passive sensors, RFID sensors, based on signal type such as BLE beacon sensors, Wi-Fi sensors, GPS sensors, location sensors based on communication protocol, e.g. iBeacon or Eddystone, or any other suitable location sensor type as may be defined according to various operational characteristics described herein, along with equivalents thereof that would be appreciated by a person having ordinary skill in the art upon reading the present descriptions. In preferred embodiments, the location sensors include various types of beacons.

Cognitive, Progressive Generation of Maps for Indoor Locations Using Location Sensor Networks Exemplary pseudocode for estimating a layout of an indoor location is given in Algorithm 1, and shown in FIG. 4, according to one embodiment. Algorithm 1, takes as input a set $\{B^{offline}\}$ of annotated location sensor readings as training data, where $\{B^{offline}\}$ includes location sensor data collected during an expert training session (or multiple such sessions) annotated with (X,Y) coordinates; a set $\{B^{static}\}$ of deployed location sensors for a given area, where $\{B^{static}\}$ includes location sensor ID information and known (X,Y) coordinate locations of the location sensors within the test environment; an initial geometric map M; a signal threshold δ defining a minimum threshold below which signals are considered "weak"; a minimum density threshold $\rho_{min}$; and a minimum crossing threshold $\chi_{min}$ (lines 1-2). The threshold δ may be set to a value determined during training, or another value manually set by a user. For each annotated data point in $\{B^{offline}\}$, identify a corresponding location sensor in $\{B^{static}\}$ and draw a line between the two. The type of line drawn between each $B^{offline}$ && $B^{static}$ is designated based on the received signal strength for the respective location sensor pair. As shown in Algorithm 1, a first type of line (e.g. solid, black, green, etc.) indicates the received signal strength (e.g. RSSI) is >=δ; while a second type of line (e.g. dotted, dashed, red, etc.) indicates the received signal strength is <δ. For instance, in one exemplary embodiment, the RSSI of beacon A at 0 meters is −55, and the threshold is set to −70 X meters away from beacon, then any RSSIs>=−70 ([−55, −70]) are considered strong signals. Any RSSI beyond the threshold −70, e.g., −72, is considered weak since −72<−70.

In another embodiment, lines of the first type represent the case in which the received signal strength between a sensing device and a location sensor is greater than or equal to some minimum threshold, t. This represents connections where the signal strength is strong. On the other hand, lines of the second type represent the case in which the received signal strength between a sensing device and a location sensor is less than a threshold, t. This corresponds to connections where the signal strength is weak (possibly due to interference between the sensing device and location sensor (e.g., walls, obstacles, machine, Wi-Fi AP)).

In such embodiments, the value t is defined by either a value learned from training data, δ, or a value K set by the user, where $$t = \begin{cases} \geq \delta, \text{ or } \overline{K} \\ < \delta, \text{ or } K \end{cases}$$

and K is a threshold that decouples strong signals and weak signals ($\overline{K}$ is a value other than K). In several exemplary embodiments the RSSI (e.g., in one approach according to IEEE 802.11) is a relative index, expressed in decibels (dB), that measures the relative quality of the received signal strength of a device.

With continuing reference to FIG. 4 and Algorithm 1, once connections (lines) between each $B^{offline}$ && $B^{static}$ are established (drawn), regions defining various area types may be defined using known convex hull algorithms such as Graham scan or Quickhull, or known clustering algorithms such as K-Means clustering or Density-Based Spatial Clustering of Applications with Noise (DBSCAN), in exemplary approaches (line 7). Other known clustering algorithms, convex hull algorithms, or equivalents thereof that would be appreciated by a person having ordinary skill in the art may be employed in other approaches without departing from the scope of the present disclosure.

The regions may be classified into the various area types using one or more filters or thresholds evaluating density of connections (lines) and/or overlap of lines (crossings) therebetween in a given region (line 8). As understood herein, density refers to "amount per unit area" since we are dealing with two-dimensional spaces in the context of Algorithm 1. Exemplary area types may include, but are not limited to: hallways, defined as dense first line type areas, e.g. having a density of first type lines above a minimum density threshold $\rho_{min}$ and sparse second line type crossings, e.g. regions having a number of crossings below a minimum crossing threshold $\chi_{min}$; walls: defined as dense second line type crossings, e.g. regions having a number of crossings above a minimum crossing threshold $\chi_{min}$ and sparse first line type areas, e.g. having a density of first type lines below a minimum density threshold $\rho_{min}$; and open spaces: defined as empty areas, e.g. regions without any fingerprinting training data, and/or dense first line type regions, e.g. regions having a density above a minimum density threshold $\rho_{min}$ and dense second line type crossings, e.g. regions having a number of crossings above the minimum crossing threshold $\chi_{min}$.

Referring again to Algorithm 1, and FIG. 4, the areas may also be labeled and/or rendered, e.g. using any suitable auto sketch functionality and/or techniques (line 9).

Optionally, (line 10), the user may be provided a draft or rendering of the map, the map preferably including regions and area types assigned thereto. Users may correct the auto-generated rendering, e.g. by manually dragging various points/vertices of the initial shape to redefine/correct into a final shape.

Whether manual adjustment of the generated map occurs or not, Algorithm 1 as shown in FIG. 4 includes labeling the completed map based on sparsity of the different regions/areas therein (line 11). The labels include "open space," "closed space," and "undetermined" in one embodiment. Of course, other labels may be included, and may be assigned based on different criteria besides, or in addition to, sparsity, in various embodiments. For example, areas may be labeled according to distance from another area, e.g. an entrance or exit, a lunchroom, a restroom, etc. Areas may further, or alternatively, be defined according to the number of location sensors present, location sensor coverage, or other operational characteristics of the location sensors.

Algorithm 1 completes, and returns a geometric map M of the corresponding area requested by the user, and based on the various inputs of location sensor data (training) and bulk location sensor data (testing). The map M includes all associations between location sensor (X, Y) coordinates and corresponding annotated location sensor readings (training data). Accordingly, the map M may be utilized to generate suggestions for optimal location sensor locations using various different sensor types and with different characteristics (e.g. battery life, broadcast rate, new/used status, expected lifetime, or any other characteristics that may be understood by a person having ordinary skill in the art upon reading the present disclosures) and guide a user through a cognitive process for deploying a location sensor network, in one embodiment.

The map M may itself be an endpoint in some embodiments, but may also be utilized to assist a user in deploying location sensors of various types, operational characteristics, battery levels, broadcast rate, expected lifetime, new/used status, etc. in an indoor environment to provide or optimize a location sensor network, in preferred approaches.

Advantageously, employing the presently described inventive concepts yields practical benefits in the context of operational cost for indoor location sensing solutions. For example, by making suggestions not only as to where location sensors should be located, but what type of location sensor (e.g. based on location sensor characteristics such as those mentioned above) to deploy at a given location, overall operational lifetime of the indoor location sensing network may be extended, and/or other operational parameters tuned, such as signal coverage, in one embodiment.

Location sensor selection by the system allows existing location sensors to be reused (e.g., refurbished location sensors). For example, in some situations it might be more efficient to use 5 location sensors with low transmission power rather than a single location sensor with highest transmission power (for example, in an easily accessed area with low or no signal interference). In other cases, it may be advantageous to alternate used location sensors between new location sensors. Combinations of these approaches may be employed without departing from the scope of the presently described inventive embodiments.

In more embodiments, the services facilitated by the present disclosed inventive concepts not only expedite the deployment of location sensors at retail and non-retail locations, but also introduces a recycling model that allows users to reuse existing devices, thus saving money and time. For example, users of the system may be coached and guided throughout the entire deployment phase, with preferences given to deploying used/refurbished location sensors where possible to reduce overall cost and minimize the need to purchase/utilize new equipment. For example, while proceeding through the deployment process, different audible signals may be provided to suggest deployment of different location sensor types.

In some instances, a user may ignore or disregard a suggested location sensor placement, and/or the type of location sensor suggested for placement at a given location. In preferred approaches, the inventive concepts described herein provide the capability to detect such "disregard/ignore" events and account for the user's actual behavior.

For example, a particular suggested location sensor type and location is provided to a user, and the user unilaterally determines following the suggestion would be disadvantageous, e.g. because attempting to deploy the suggested location sensor type did not result in signal detection, or resulted in only weak/unreliable signal detection. Accordingly, the user replaces the suggested location sensor type with another type having, e.g. more battery power, a larger antenna, a newer location sensor, etc. as would be understood by a person having ordinary skill in the art upon reading the present disclosures.

The system may detect the configuration/settings/characteristics of the location sensor actually deployed by the user, and make certain inferences in response thereto, e.g. that the signal strength in the deployed location is less than expected, or signal interference is greater than expected, etc. as would be appreciated by a person having ordinary skill in the art upon reviewing these descriptions.

To illustrate the operation and advantages of the inventive concepts disclosed herein, according to one exemplary embodiment, the inventors collected training data in various indoor spaces, e.g. different floor plans that include large open space areas or areas with hallways, and, using this training data, evaluated the geometric map generation process of the presently disclosed inventive cognitive progressive methods and systems, the results of which are discussed below.

According to various embodiments, a training data set includes of a set of location sensor readings, e.g. beacon readings, collected at (X, Y) locations in a space equipped with appropriate location sensors. The remaining discussion of the exemplary, experimental embodiment will refer to location sensors as "beacons" but it should be appreciated that in various embodiments other location sensor types may be employed without departing from the scope of the inventive concepts presented herein. The identifying information and suitable signal strength (or other equivalent information/measures) may differ for different location sensor types, but tailoring the inventive concept as presented below with respect to beacons to other location sensor types should be considered within the scope of the present disclosure.

At any rate, for each (X, Y) location, a beacon's identifying information and other information (e.g., relative received signal strength indicator (RSSI)) sensed by a sensing device (e.g., an iOS device) are saved along with a current timestamp and (X, Y) location of where the measurements were sensed/taken. The training data may be utilized to provide a set of known locations within a given space, e.g. an indoor space, the known locations corresponding to various location sensors deployed throughout the space.

The known locations may be utilized to determine location of other objects, and/or sources of signal interference, throughout the 2-dimensional or 3-dimensional space. For example, assume the sensing device sensed 4 beacons at a location, but 3 out of the 4 beacons' RSSIs could not be determined. However, the remaining beacon was sensed and RSSI could be determined (as for group 3 in Table 1 below).

For a given (X, Y) location, the set of beacons sensed at that location might be in range or out of range, as determined by some threshold or known quantity. If the beacons are out of range, this might be due to some interference present in the space (e.g., walls, obstacles). Out of range beacons can mean two things: (1) a beacon is located too far away that the sensing device cannot sense it at all; and/or (2) a beacon is located a distance away from the sensing device such that the signal is noisy and the visibility of the beacon's signal is intermittent. To demonstrate this notion, Table 1 shows exemplary beacons' identifying information and other information for 3 different locations that were sensed at the given (X, Y) location, according to one experimental embodiment.

For each set of beacons sensed at the given location, identifying information (including, but not limited to, major ID, minor ID, and/or UUID, in any combination), RSSI, and timestamp are determined, as shown in Table 1. For example, at (X, Y)=(375, 274), 4 beacons were sensed. Only 1 beacon has a valid/usable RSSI reading. It is important to note that the number of beacons per set/group may vary. For example, in a preferred embodiment a set/group of beacons is defined as the number of beacons detected at a given location at a given instance in time. For example, only 2 beacons were sensed at location (374, 127) at time 20:50:56+0000, whereas 4 beacons were sensed at location (378, 253) at time 20:51:09+0000. Of course, other ways of defining beacon groups/sets may be employed without departing from the scope of the present application.

TABLE 1

Exemplary Beacon Readings Annotated by (X, Y) Coordinate and Timestamp

| Set/Group ID | (X, Y) | Timestamp | Beacon ID (major:minor) | RSSI |
|---|---|---|---|---|
| 1 | (374, 127) | 20:50:56+0000 | 3:7 | −96 |
|  |  |  | 3:11 | −89 |
| 2 | (378, 253) | 20:51:09+0000 | 3:1 | 0 |
|  |  |  | 3:7 | −97 |
|  |  |  | 3:11 | 0 |
|  |  |  | 3:12 | 0 |
| 3 | (375, 274) | 20:51:11+0000 | 3:1 | −90 |
|  |  |  | 3:7 | 0 |

TABLE 1-continued

Exemplary Beacon Readings Annotated
by (X, Y) Coordinate and Timestamp

| Set/Group ID | (X, Y) | Timestamp | Beacon ID (major:minor) | RSSI |
|---|---|---|---|---|
| | | | 3:11 | 0 |
| | | | 3:12 | 0 |

As shown in Table 1 above, for each set of beacons sensed, the RSSI may not always be useful. For example, for set ID 2, beacon IDs 3:1, 3:11, and 3:12 have an RSSI of 0. This could mean that the sensing device could sense the beacon (e.g. able to read, acquire, or otherwise derive from the received signal a major and minor ID) but not all beacon packets were received within a 1-second cycle; or for some unknown reason, the RSSI could not be determined. This is the behavior that has been observed, according to one exemplary embodiment, for an iOS device, but may be different for other devices (e.g., Android or Raspberry Pi device, etc. as would be understood by a person having ordinary skill in the art upon reading the present disclosure). However, the RSSI threshold that determines when a beacon is within range or not can be learnt from the training data or using known methods. Reaching this noisy "threshold" RSSI value could be due to the beacon being on the other side of a wall or an obstacle causing some sort of RF interference.

It is possible to extrapolate the geometry of various spaces by representing as lines all connections between beacons and training points as follows: Case 1: All connections where a beacon was sensed but it reached a noisy RSSI threshold value or RSSI could not be determined. Case 2: All connections where a beacon was sensed and the RSSI could be determined and was within the boundaries of a specified threshold.

By looking at the density of signal connections drawn according to the binary classification above, the geometrical shape of a space can be inferred as: (1) a closed space, if: the density of strong signals is more prominent in areas that are more accessible (e.g., hallways, walkable spaces, doorways, etc.) than the current location (where "prominence" is synonymous with "greater than", such that a density of strong signals is more prominent than other areas if the given area has more strong signals per unit area than the respective "other area"); and/or the density of weak signals is more prominent in areas that are not accessible (e.g., across a room, through walls, etc.) than the current location; (2) an open space, if: a density distribution of strong and weak signals differ, e.g. a distribution characterized by a ratio of strong to weak signals in a range from about 70:30 or 80:20, etc. in various embodiments and as would be appreciated by a skilled artisan upon reviewing the instant disclosure; and (3) an undetermined space, if: a density distribution of strong and weak signals is about the same, e.g. a distribution characterized by a ratio of strong to weak signals in a range from about 40:60 to about 60:40, preferably in a range from about 45:55 to 55:45, and most preferably a ratio of about 50:50, according to various embodiments and within the given location.

Accordingly in FIG. 5 a method 500 for cognitively, progressively generating a map of an indoor location using a location sensor network is shown, according to one embodiment. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where training data are received. The training data include a plurality of location sensor signal measurements associated with location information corresponding to the signal measurement, e.g. such as may be collected during performance of a method 300 or the like. Each location sensor signal measurement includes a received signal strength, identifying information for a location sensor from which the signal was received, and a location within the indoor environment corresponding to the location sensor or the sensing device receiving the signal from the location sensor, in alternative embodiments. Accordingly, the training data may include a plurality of signal strength measurements, corresponding location sensor identity information, and associated (X, Y) location coordinates.

Method 500 also includes receiving static data comprising an identification and a location of each of a plurality of location sensors deployed throughout the indoor environment in operation 504. The static data may reflect a current or estimated location sensor network distribution of location sensors throughout a given indoor environment, in various approaches. The identification of the location sensors may be provided in any suitable form, but preferably includes at least one unique identifier for each location sensor. In the particularly preferred embodiment of BLE beacons as the location sensors, the identification includes a major ID, a minor ID, and a universally unique identifier (UUID). The UUID may identify a building or other specific large entity, e.g. train station, ballpark, airport; the major ID may identify a floor of a building or similarly broad indication of location, while the minor ID may identify a particular room or other specific indication of location, each within an indoor environment. Other suitable types of identifying information include an IP address, MAC address, pathname, serial number, or any other variety of identifying information for various location sensor types as would be known by those having ordinary skill in the art upon reading the present descriptions.

A plurality of connections, e.g. lines, are established between the static data and training data in operation 506. The connections preferably represent signal strength between a given location sensor defined in the static data, and one or more locations where a measurement was taken, as reflected in the training data.

Accordingly, if represented graphically, the map being generated in the process of method 500 may include lines of various types, such as lines of a first type (e.g. solid, of a particular color, etc.) identifying connections with a signal strength greater than or equal to a predetermined minimum signal strength threshold (e.g. δ as described above with reference to FIG. 4 and Algorithm 1), as well as lines of a second type (e.g. dotted, dashed, of a second particular color, etc.) identifying connections with a signal strength less than the predetermined minimum signal strength threshold.

Once connections are established, regions within the overall environment are identified based on the plurality of connections between the static data and the training data. The regions are identified using known techniques such as a complex hull algorithm, e.g. via Graham scan or a Quickhull algorithm, or known clustering algorithms, e.g. K-Means clustering or Density-Based Spatial Clustering of Applications with Noise (DBSCAN), in operation 508. Other known clustering algorithms, convex hull algorithms, or equivalents thereof that would be appreciated by a person having ordinary skill in the art may be employed in other approaches without departing from the scope of the present disclosure.

The regions are accordingly labeled by type in operation 510. Various types described hereinabove may be employed, such as hallways, walls, open spaces, enclosed spaces, rooms, corridors, doorways, entryways, etc. in various embodiments. Labels may be assigned based on the density or sparsity of various features within each region of the map.

For example, regions of different types may be defined based on density of connections indicating strong or weak signal strength (e.g. number or density of lines of the first or second types). Regions may also be defined based on density of connection intersections (or overlap, or crossover, equivalently), such as density of intersections between connections indicating strong or weak signal strength. Regions may still further be defined based on whether a path defined by a plurality of signal measurements, e.g. from training data, define a regular (e.g. linear, polygonal, etc.) path or not. For instance, hallways, corridors, etc. tend to be characterized by signal measurements taken therein resting along a substantially linear path (or series of connected line segments). On the other hand, open spaces tend to be characterized by signal measurements that may not follow any well-defined or identifiable path.

In operation 512, the map is output. The map may be output to a memory, a display, or any other suitable destination for immediate or subsequent use. Preferably, the map includes or otherwise identifies the location of each of the plurality of location sensors throughout the indoor environment; the plurality of regions and respective locations thereof within the indoor environment; and the type of each region.

Optionally, but preferably, the map also includes the plurality of connections and a series of lines indicating walls, hallways, open spaces, etc. The lines are generated using any suitable auto sketch and labeling technique known in the art.

In some approaches, the static data comprise: a type and/or a remaining power of each location sensor; and the predetermined minimum signal strength threshold is based on the type and/or the remaining power of a respective location sensor identified in the static data and forming one end of one of the connections.

The method 500 as shown in FIG. 5 has been described in accordance with one exemplary approach, but it shall be appreciated that in various embodiments the inventive concept represented by FIG. 5 and method 500 may include any number of additional and/or alternative features, especially including but not limited to those discussed above regarding FIGS. 3-4 for location sensor deployment and map generation.

For instance, in one approach the static data include: a type and/or a remaining power of each location sensor; and the predetermined minimum signal strength threshold is based on the type and/or the remaining power of a respective location sensor identified in the static data and forming one end of one of the connections.

One Dimensional Sensor Network and Location Services

As noted above, two or three-dimensional location services may be useful in a large number of contexts, but are also overcomplicated and therefore both more expensive and less reliable than simpler situations dealing with the same, or a similar, problem only in one dimension.

In some embodiments, the location sensor network described herein may be configured particularly to map one-dimensional locations to sensor signals, such as vertical location of an object within an indoor space such as an elevator shaft, stairwell, escalator, etc., a horizontal or depth-wise location of an object within an indoor space such as a track, hallway, tunnel, corridor, or other extended space along one dimension, as would be understood by a person having ordinary skill in the art upon reading the present disclosures.

In order to track a device that moves on a track or otherwise is restricted to linear motion, one can attach a radio source of known transmission power to the device and place a stationary receiver along the track, especially near one end of the track's path. In the case of an elevator to be tracked, the location sensor would be placed in the elevator car and the receiver would be placed near the bottom or top floor near enough to the elevator to receive the signal from the location sensor.

The signal strength read at the receiver can be used to calculate the position of the car on its track. By calibrating the location sensor with a fixed and adequate transmission power and taking readings from the system with the car at each floor, one can create a mapping of the measured signal readings at each position. The system can then report the position of the car at any time.

The inventive system has the advantages of using a potentially battery powered long lasting location sensor in the moving car, which often has restrictive power, fire and weight considerations. The receiver, being stationary, can be placed where power is easily obtained and can also be networked, enabling remote tracking of the device, especially in situations where such tracking was not part of the original configuration. Additionally, a portable receiver could be used in emergencies when power is out to detect the proximity of the elevator to the receiver.

The inventive embodiment presently described includes placing a location sensor such as a radio beacon on a device to be tracked. In the simplest case, the device would be an elevator and the location sensor could be a beacon configured, e.g., using iBeacon or Eddystone protocols, or any other equivalent thereof that would be appreciated by a person having ordinary skill in the art upon reading the present descriptions. In preferred approaches, location sensors such as beacons are or include Bluetooth Low Energy (BLE) radio devices, which may be powered by solar cells, batteries, etc. and has dimensions of about 1.0×1.0×0.5 inches (height by width by depth (H×W×D)) or more. In a particularly preferred embodiment, beacons have dimensions of about 2.0×2.0×0.5 inches (H×W×D). The location sensor device can be placed above the elevator car ceiling, attached to a wall inside the car, or tucked into the phone box or button panel.

The second component of the one-dimensional tracking embodiment includes a receiver, suitable for receiving the signal from the location sensor and reporting the received signal strength indicator (RSSI), and/or received signal strength determined based at least in part on the RSSI. The receiver is ideally placed near the track/shaft of the device to be tracked, at one end of the track.

The signal reported by the receiver is converted to a numeric representation of signal strength. In one implementation, the receiver is a Raspberry Pi Model 3 computer device which can detect location sensors and report their signal strength and ID. Of course, other suitable sensing devices, preferably mobile devices, may be employed in alternative approaches, without departing from the scope of the inventive embodiments described herein.

The invention is configured to convert the signal strength into a measure of the location along the one dimensional path, e.g. for an elevator the floor where the car is located. More distant locations (lower floors) have lower, or even no, received signal strength. The closest locations have the strongest signal strength. By recording the signal strengths at each location, or sampling signal strength at certain locations and interpolating between sample locations, one can create a mapping between signal strength and elevator car location.

Stability or variability of signal strength can additionally or alternatively be used as an indicator of a stationary or moving car and the direction of the variability, e.g. signal getting stronger, can be interpreted as the car is moving—moving toward the receiver when the signal is getting stronger, away from the receiver when the signal is getting weaker, and standing still when signal is stable in strength.

The invention can be enhanced to keep a history of all elevator actions by recording the position or floor (e.g. 1, 2, 3, etc.) at each point in time and the direction trend (toward, away, stationary) based on the rate of change in the signal.

Figure 6:
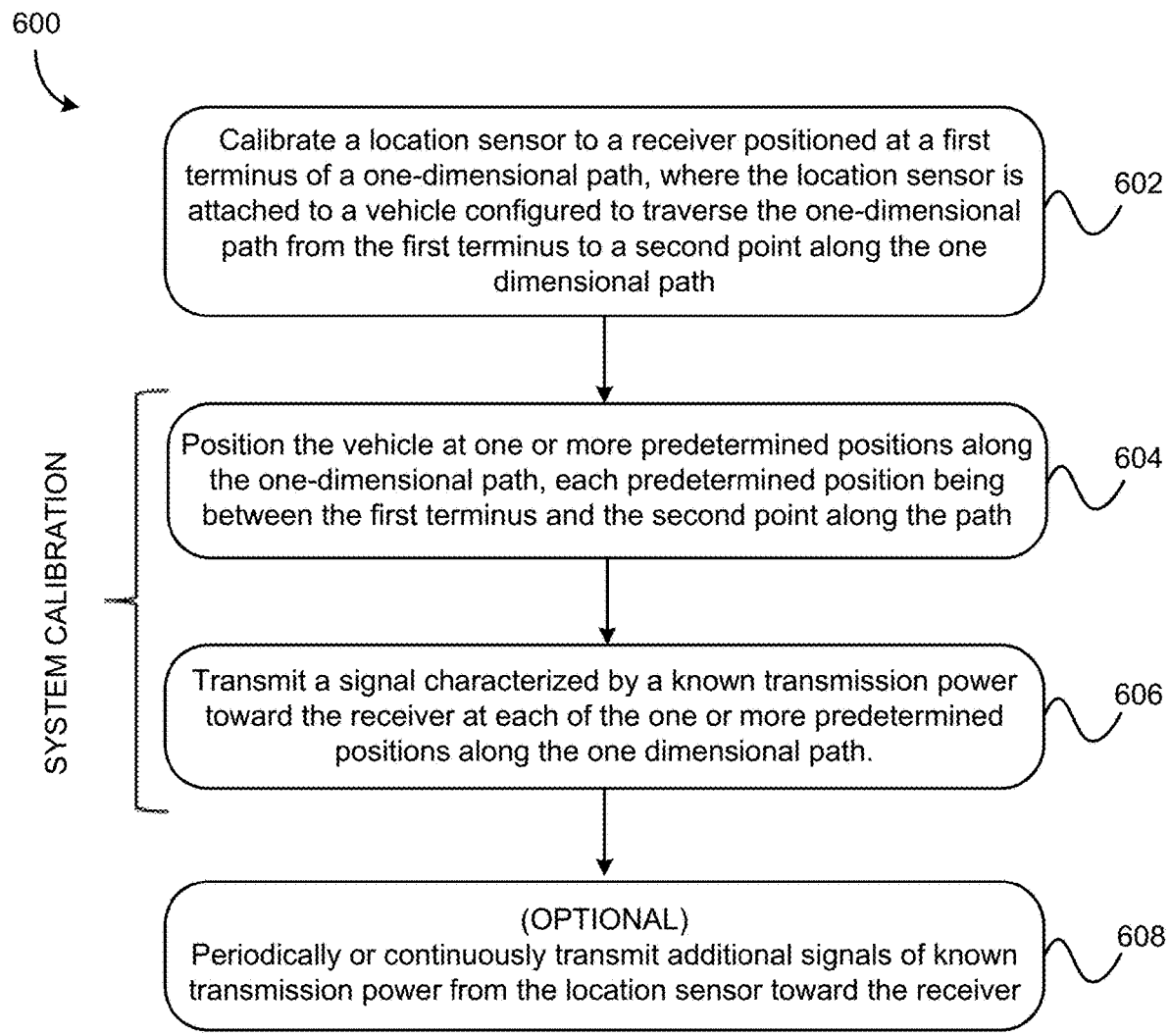
FIG. 6 illustrates flowchart of a method for tracking a vehicle location along a one-dimensional path, in accordance with one embodiment.

Accordingly in FIG. 6 a method 600 for tracking a device capable of moving along one dimension is shown according to one embodiment. The method 600 may be performed in accordance with the present invention in any of the environments depicted in FIGS. 1-2, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a location sensor such as a BLE beacon, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a location sensor such as a BLE beacon is calibrated with a receiver positioned at a first terminus of a one-dimensional path. The location sensor is attached to a vehicle configured to traverse the one-dimensional path from the first terminus to at least a second point along the one dimensional path, in preferred embodiments.

Calibrating the location sensor with the receiver involves optionally, but preferably and repeatedly, performing operations 604-606, though these operations must be performed at least once to accomplish calibration. In operation 604, the vehicle is positioned at one or more predetermined locations along the one-dimensional path, each such location being located between the first terminus and the second point along the path.

In operation 606, a signal is transmitted from the vehicle toward the receiver at each of the predetermined locations. The signals are characterized by a known signal strength, and the optionally distance between the receiver and the location sensor is also known. This permits inference as to the location of the vehicle along the path upon receipt and analysis by the receiver.

Accordingly, and optionally, after calibration, method 600 involves periodically (e.g. every second, every minute, every 5 minutes, every hour, every day, according to a time increment corresponding to an expected travel time/distance between subsequent points along the one dimensional path, etc. as would be appreciated by a person having ordinary skill in the art upon reading the present disclosure) or continuously transmitting signals of known transmission power from the location sensor to the receiver in operation 608, so as to allow periodic or continuous monitoring of the location of the vehicle along the one dimensional path. Signals may be transmitted, for example, along predetermined intervals or at predetermined positions along the path (such as floors for an elevator, stops for a subway, etc.).

In a particularly preferred embodiment of method 600, the location sensor is a Bluetooth Low Energy (BLE) radio device, powered by batteries, solar cells, fuel cells, or the like, and is characterized by dimensions of about 1.0×1.0×0.5 inches (H×W×D) or greater, most preferably about 2.0×2.0×0.5 inches (H×W×D).

It shall be appreciated that in various embodiments the inventive concept represented by FIG. 6 and method 600 may include any number of additional and/or alternative features, especially including but not limited to those discussed above regarding FIGS. 3-5 for location sensor deployment and map generation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for cognitive, progressive deployment of an indoor location sensor network, the method comprising:
   providing an instruction to deploy a first location sensor at a first location within an indoor environment;
   receiving a first plurality of signals from the first location sensor while moving away from the first location sensor, wherein each of the first plurality of signals is characterized by a signal strength;
   analyzing each of the first plurality of signals received from the first location sensor to determine the signal strength thereof;
   in response to determining: the signal strength of a last received one of the first plurality of signals from the first location sensor is less than a predetermined minimum signal strength threshold, and/or a distance traveled from the first location sensor is greater than or equal to a maximum inter-sensor distance threshold:
      providing an instruction to deploy a second location sensor at a second location within the indoor environment, the second location being a position where: the signal strength of the last received one of the first plurality of signals from the first location sensor was less than the predetermined minimum signal strength threshold, and/or the distance traveled from the first location sensor was greater than or equal to the maximum inter-sensor distance threshold;
   receiving a second plurality of signals from the first location sensor and the second location sensor, while moving away from at least the second location sensor, wherein each of the second plurality of signals is characterized by a signal strength;
   analyzing each of the second plurality of signals to determine the signal strength thereof;
   in response to determining: the signal strength of: a last received one of the second plurality of signals from the first location sensor and/or a last received one of the second plurality of signals from the second location sensor is less than a predetermined minimum signal strength threshold, and/or a distance traveled from the second location sensor is greater than or equal to the maximum inter-sensor distance threshold: providing an instruction to deploy a third location sensor at a third location within the indoor environment, the third location being a position where: the signal strength of the last received one of the second plurality of signals from the first location sensor and/or the last received one of the second plurality of signals from the second location sensor was less than the predetermined minimum signal strength threshold, and/or the distance traveled from the second location sensor was greater than or equal to the maximum inter-sensor distance threshold; and
   designating a type of each location sensor to be deployed in the location sensor network, wherein the minimum signal strength threshold and the maximum inter-sensor distance threshold are each based on the type of location sensor to be deployed in the location sensor network.

2. The method as recited in claim 1, further comprising: iteratively repeating the following steps until a predetermined threshold amount of the indoor environment, has been visited by a user operating a sensing device:
   receiving signals from at least the first location sensor, the second location sensor, the third location sensor, and an iteratively increasing number of additional location sensors placed throughout the indoor environment, wherein each signal is characterized by a respective signal strength;
   analyzing each of the received signals to determine the signal strength thereof; and
   providing an instruction to deploy an additional location sensor in response to determining at least one condition selected from the group consisting of:
      the signal strength of one of the signals received from the first location sensor, the second location sensor, the third location sensor, and/or one of the iteratively increasing number of additional location sensors placed throughout the indoor environment is less than the predetermined minimum signal strength threshold; and
      a distance traveled from the first location sensor, the second location sensor, the third location sensor, and/or one of the iteratively increasing number of additional location sensors placed throughout the indoor environment is greater than or equal to a maximum inter-sensor distance threshold.

3. The method as recited in claim 2, further comprising: generating a composite map of the indoor environment based on a plurality of signals received from the first location sensor, the second location sensor, the third location sensor, and one or more of the additional location sensors.

4. The method as recited in claim 1, further comprising:
   designating a type of the first location sensor prior to deploying the first location sensor at the first location;
   retrieving a template from a knowledge base, the template corresponding to the type of the first location sensor and describing best practices for the maximum inter-sensor distance according to various spatial configurations possible within the indoor environment; and
   wherein the instructions to deploy the first location sensor, the instructions to deploy the second location sensor, and the instructions to deploy the third location sensor, and instructions to deploy any additional location sensors in the location sensor network are based on the template.

5. The method as recited in claim 1, wherein the location sensor network comprises a plurality of different location sensor types each characterized by a different average signal strength, a different average signal sensitivity, and/or a different average signal range.

6. The method as recited in claim 1, further comprising:
   determining no a priori knowledge is available regarding operational characteristics of the designated type of a given location sensor to be deployed in the location sensor network;
   determining one or more of the operational characteristics of the designated type of the given location sensor during deployment thereof within the location sensor network; and
   storing the determined one or more operational characteristics of the designated type of the given location sensor in a knowledge base for future use.

7. The method as recited in claim 1, further comprising: designating a remaining power and/or battery level of each location sensor to be deployed in the location sensor network; and
   wherein the minimum signal strength threshold and the maximum inter-sensor distance threshold are each based on the remaining power and/or battery level of the respective location sensor to be deployed in the location sensor network.

8. The method as recited in claim 7, wherein the location sensor network comprises a plurality of different location sensor types, each location sensor type being characterized by different operational characteristics selected from the group consisting of:

remaining power, power source, broadcast rate, expected lifetime, prior use status, communication protocol, and signal type.

9. The method as recited in claim 1, further comprising: receiving a plurality of signals from the first location sensor, the second location sensor, and the third location sensor, wherein each signal is characterized by a signal strength; and estimating a shape of an area enclosed by the first location sensor, the second location sensor, and the third location sensor based on the respective signal strength of the received plurality of signals.

10. A computer program product for cognitive, progressive deployment of an indoor location sensor network includes a computer readable medium having program instructions embodied therewith, wherein the computer readable medium is not a transitory signal per se, and the program instructions are executable by a sensing device to cause the sensing device to perform a method comprising:

providing, via the sensing device, an instruction to deploy a first location sensor at a first location within an indoor environment;

receiving, at the sensing device, a first plurality of signals from the first location sensor while moving away from the first location sensor, wherein each signal is characterized by a signal strength;

analyzing, using a processor of the sensing device, each of the first plurality of signals received from the first location sensor to determine the signal strength thereof;

in response to determining, using the processor of the sensing device: the signal strength of a last received one of the first plurality of signals from the first location sensor is less than a predetermined minimum signal strength threshold, and/or a distance traveled from the first location sensor is greater than or equal to a maximum inter-sensor distance threshold:

providing an instruction, via the sensing device, to deploy a second location sensor at a second location within the indoor environment, the second location being a position where: the signal strength of the last received one of the first plurality of signals from the first location sensor was less than the predetermined minimum signal strength threshold, and/or the distance traveled from the first location sensor was greater than or equal to the maximum inter-sensor distance threshold;

receiving, at the sensing device, a second plurality of signals from the first location sensor and the second location sensor, while moving away from at least the second location sensor, wherein each of the second plurality of signals is characterized by a signal strength;

analyzing, using the processor of the sensing device, each of the second plurality of signals to determine the signal strength thereof;

in response to determining, using the processor of the sensing device: the signal strength of a last received one of the second plurality of signals from the first location sensor and/or a last received one of the second plurality of signals from the second location sensor is less than a predetermined minimum signal strength threshold, and/or a distance traveled from the second location sensor is greater than or equal to a maximum inter-sensor distance threshold: providing, via the sensing device, an instruction to deploy a third location sensor at a third location within the indoor environment, the third location being a position where: the signal strength of the last received one of the second plurality of signals from the first location sensor and/or the last received one of the second plurality of signals from the second location sensor was less than the predetermined minimum signal strength threshold, and/or the distance traveled from the second location sensor was greater than or equal to the maximum inter-sensor distance threshold; and designating, at the sensing device, a type of each location sensor to be deployed in the location sensor network, wherein the minimum signal strength threshold and the maximum inter-sensor distance threshold are each based on the type of location sensor to be deployed in the location sensor network.

11. The computer program product as recited in claim 10, comprising program instructions for causing the sensing device to iteratively repeat the following steps until a predetermined threshold amount of the indoor environment, has been visited by a user operating a sensing device:

receive signals from at least the first location sensor, the second location sensor, the third location sensor, and an iteratively increasing number of additional location sensors placed throughout the indoor environment, wherein each signal is characterized by a respective signal strength;

analyze each of the received signals to determine the signal strength thereof; and provide an instruction to deploy an additional location sensor in response to determining at least one condition selected from the group consisting of:

the signal strength of one of the signals received from the first location sensor, the second location sensor, the third location sensor, and/or one of the iteratively increasing number of additional location sensors placed throughout the indoor environment is less than the predetermined minimum signal strength threshold; and a distance traveled from the first location sensor, the second location sensor, the third location sensor, and/or one of the iteratively increasing number of additional location sensors placed throughout the indoor environment is greater than or equal to a maximum inter-sensor distance threshold.

12. The computer program product as recited in claim 11, comprising program instructions for causing the sensing device to generate a composite map of the indoor environment based on a plurality of signals received from the first location sensor, the second location sensor, the third location sensor, and a plurality of the additional location sensors.

13. The computer program product as recited in claim 10, comprising program instructions for causing the sensing device to designate a type of the first location sensor prior to deploying the first location sensor at the first location; and retrieve a template from a knowledge base, the template corresponding to the type of the first location sensor and describing best practices for the maximum inter-sensor distance according to various spatial configurations possible within the indoor environment; and wherein the instructions to deploy the first location sensor, the instructions to deploy the second location sensor, and the instructions to deploy the third location sensor, and instructions to deploy any additional location sensors in the location sensor network are based on the template.

14. The computer program product as recited in claim 10, wherein the location sensor network comprises a plurality of different location sensor types each characterized by a different average signal strength, a different average signal sensitivity; and/or a different average signal range.

15. The computer program product as recited in claim 10, further comprising: determining no a priori knowledge is available regarding operational characteristics of the designated type of a given location sensor to be deployed in the location sensor network;
    determining one or more of the operational characteristics of the designated type of the given location sensor during deployment thereof within the location sensor network; and
    storing the determined one or more operational characteristics of the designated type of the given location sensor in a knowledge base for future use.

16. The computer program product as recited in claim 10, further comprising: designating a remaining power and/or battery level of each location sensor to be deployed in the location sensor network; and
    wherein the minimum signal strength threshold and the maximum inter-sensor distance threshold are each based on the remaining power and/or battery level of the respective location sensor to be deployed in the location sensor network.

17. The computer program product as recited in claim 16, wherein the location sensor network comprises a plurality of different location sensor types, each location sensor type being characterized by different operational characteristics selected from the group consisting of: remaining power, power source, broadcast rate, expected lifetime, prior use status, communication protocol, and signal type.

18. The computer program product as recited in claim 10, further comprising: receiving a plurality of signals from the first location sensor, the second location sensor, and the third location sensor, wherein each signal is characterized by a signal strength; and
    estimating a shape of an area enclosed by the first location sensor, the second location sensor, and the third location sensor based on the respective signal strength of the received plurality of signals.

19. A system for cognitive, progressive deployment of an indoor location sensor network, comprising:
    a processor; and
    logic integrated with the processor, executable by the processor, or integrated with and executable by the processor, the logic being configured to:
        provide an instruction to deploy a first location sensor at a first location within an indoor environment;
        receive a first plurality of signals from the first location sensor while moving away from the first location sensor, wherein each signal is characterized by a signal strength;
        analyze each of the first plurality of signals received from the first location sensor to determine the signal strength thereof;
        in response to determining: the signal strength of a last received one of the first plurality of signals from the first location sensor is less than a predetermined minimum signal strength threshold, and/or a distance traveled from the first location sensor is greater than or equal to a maximum inter-sensor distance threshold:
            provide an instruction to deploy a second location sensor at a second location within the indoor environment, the second location being a position where: the signal strength of the last received one of the first plurality of signals from the first location sensor was less than the predetermined minimum signal strength threshold, and/or the distance traveled from the first location sensor was greater than or equal to the maximum inter-sensor distance threshold;
        receive a second plurality of signals from the first location sensor and the second location sensor, while moving away from at least the second location sensor, wherein each of the second plurality of signals is characterized by a signal strength;
        analyze each of the second plurality of signals to determine the signal strength thereof;
        in response to determining: the signal strength of a last received one of the second plurality of signals from the first location sensor and/or a last received one of the second plurality of signals from the second location sensor is less than a predetermined minimum signal strength threshold, and/or a distance traveled from the second location sensor is greater than or equal to a maximum inter-sensor distance threshold: provide an instruction to deploy a third location sensor at a third location within the indoor environment, the third location being a position where: the signal strength of the last received one of the second plurality of signals from the first location sensor and/or the last received one of the second plurality of signals from the second location sensor was less than the predetermined minimum signal strength threshold, and/or the distance traveled from the second location sensor was greater than or equal to the maximum inter-sensor distance threshold; and
        designate a type of each location sensor to be deployed in the location sensor network, wherein the minimum signal strength threshold and the maximum inter-sensor distance threshold are each based on the type of location sensor to be deployed in the location sensor network.

20. A system for cognitive, progressive deployment of an indoor location sensor network, comprising:
    a processor; and
    logic integrated with the processor, executable by the processor, or integrated with and executable by the processor, the logic being configured to:
        provide an instruction to deploy a first location sensor at a first location within an indoor environment;
        receive a first plurality of signals from the first location sensor while moving away from the first location sensor, wherein each signal is characterized by a signal strength;
        analyze each of the first plurality of signals received from the first location sensor to determine the signal strength thereof;
        in response to determining: the signal strength of a last received one of the first plurality of signals from the first location sensor is less than a predetermined minimum signal strength threshold, and/or a distance traveled from the first location sensor is greater than or equal to a maximum inter-sensor distance threshold:

provide an instruction to deploy a second location sensor at a second location within the indoor environment, the second location being a position where: the signal strength of the last received one of the first plurality of signals from the first location sensor was less than the predetermined minimum signal strength threshold, and/or the distance traveled from the first location sensor was greater than or equal to the maximum inter-sensor distance threshold;

receive a second plurality of signals from the first location sensor and the second location sensor, while moving away from at least the second location sensor, wherein each of the second plurality of signals is characterized by a signal strength;

analyze each of the second plurality of signals to determine the signal strength thereof; and in response to determining: the signal strength of a last received one of the second plurality of signals from the first location sensor and/or a last received one of the second plurality of signals from the second location sensor is less than a predetermined minimum signal strength threshold, and/or a distance traveled from the second location sensor is greater than or equal to a maximum inter-sensor distance threshold: provide an instruction to deploy a third location sensor at a third location within the indoor environment, the third location being a position where: the signal strength of the last received one of the second plurality of signals from the first location sensor and/or the last received one of the second plurality of signals from the second location sensor was less than the predetermined minimum signal strength threshold, and/or the distance traveled from the second location sensor was greater than or equal to the maximum inter-sensor distance threshold; and designate a remaining power and/or battery level of each location sensor to be deployed in the location sensor network, wherein the minimum signal strength threshold and the maximum inter-sensor distance threshold are each based on the remaining power and/or battery level of the respective location sensor to be deployed in the location sensor network.

21. A computer program product for cognitive, progressive deployment of an indoor location sensor network includes a computer readable medium having program instructions embodied therewith, wherein the computer readable medium is not a transitory signal per se, and the program instructions are executable by a sensing device to cause the sensing device to perform a method comprising:

providing, via the sensing device, an instruction to deploy a first location sensor at a first location within an indoor environment;

receiving, at the sensing device, a first plurality of signals from the first location sensor while moving away from the first location sensor, wherein each of the first plurality of signals is characterized by a signal strength;

analyzing, using a processor of the sensing device, each of the first plurality of signals received from the first location sensor to determine the signal strength thereof;

in response to determining, using the processor of the sensing device: the signal strength of a last received one of the first plurality of signals from the first location sensor is less than a predetermined minimum signal strength threshold, and/or a distance traveled from the first location sensor is greater than or equal to a maximum inter-sensor distance threshold:

providing an instruction, via the sensing device, to deploy a second location sensor at a second location within the indoor environment, the second location being a position where: the signal strength of the last received one of the first plurality of signals from the first location sensor was less than the predetermined minimum signal strength threshold, and/or the distance traveled from the first location sensor was greater than or equal to the maximum inter-sensor distance threshold;

receiving, at the sensing device, a second plurality of signals from the first location sensor and the second location sensor, while moving away from at least the second location sensor, wherein each of the second plurality of signals is characterized by a signal strength;

analyzing, using the processor of the sensing device, each of the second plurality of signals to determine the signal strength thereof;

in response to determining, using the processor of the sensing device: the signal strength of a last received one of the second plurality of signals from the first location sensor and/or a last received one of the second plurality of signals from the second location sensor is less than a predetermined minimum signal strength threshold, and/or a distance traveled from the second location sensor is greater than or equal to a maximum inter-sensor distance threshold: providing, via the sensing device, an instruction to deploy a third location sensor at a third location within the indoor environment, the third location being a position where: the signal strength of the last received one of the second plurality of signals from the first location sensor and/or the last received one of the second plurality of signals from the second location sensor was less than the predetermined minimum signal strength threshold, and/or the distance traveled from the second location sensor was greater than or equal to the maximum inter-sensor distance threshold; and designating, at the sensing device, a remaining power and/or battery level of each location sensor to be deployed in the location sensor network, wherein the minimum signal strength threshold and the maximum inter-sensor distance threshold are each based on the remaining power and/or battery level of the respective location sensor to be deployed in the location sensor network.

\* \* \* \* \*